United States Patent
Takahashi et al.

(10) Patent No.: US 6,272,077 B1
(45) Date of Patent: Aug. 7, 2001

(54) MAGNETO-OPTICAL RECORDING MEDIUM HAVING INTERMEDIATE LAYER OF IN PLANE MAGNETIZATION

(75) Inventors: Akira Takahashi, Nara; Michinobu Mieda, Shiki-gun; Naoyasu Iketani, Tenri; Go Mori, Nara; Junsaku Nakajima, Kashihara; Yoshiteru Murakami, Nishinomiya; Junji Hirokane, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/479,256

(22) Filed: Jan. 7, 2000

Related U.S. Application Data

(62) Division of application No. 09/032,985, filed on Mar. 2, 1998, now Pat. No. 6,147,939.

(30) Foreign Application Priority Data

| Mar. 6, 1997 | (JP) | 9-51372 |
| Mar. 18, 1997 | (JP) | 9-63680 |
| Mar. 24, 1997 | (JP) | 9-69446 |
| Aug. 28, 1997 | (JP) | 9-232227 |

(51) Int. Cl.$^7$ ................................................. G11B 11/10
(52) U.S. Cl. .................. 369/13; 369/166; 360/57; 428/694 MM
(58) Field of Search ............................ 369/13, 14, 116; 365/122; 428/694 MM, 64.3, 611; 360/58.114, 57

(56) References Cited

U.S. PATENT DOCUMENTS

| 5,623,458 | * | 4/1997 | Matsumoto et al. | 369/13 |
| 5,640,374 |   | 6/1997 | Hirokane et al. | 369/13 |

(List continued on next page.)

FOREIGN PATENT DOCUMENTS

| 195 36 796 A1 | 2/1995 | (DE) . |
| 195 06 374 A1 | 9/1995 | (DE) . |

(List continued on next page.)

OTHER PUBLICATIONS

H. Awano, et al., Magnetic Domain Expansion Readout for Amplification of an Ultra High Density Magneto–Optical Recording Signal, published by American Institute of Physics (1996).

(List continued on next page.)

Primary Examiner—David Hudspeth
Assistant Examiner—Kim-Kwok Chu
(74) Attorney, Agent, or Firm—Dike, Bronstein, Roberts & Cushman, LLP; David G. Conlin; David A. Tucker

(57) ABSTRACT

A magneto-optical memory medium according to the present invention comprises a reproducing layer, which has in-plane magnetization at room temperature and perpendicular magnetization when heated to above a predetermined temperature by a reproducing light beam; a recording layer, which is magnetostatically coupled to the reproducing layer; and an in-plane magnetized layer, provided adjacent to the recording layer, which has a Curie temperature at the above-mentioned predetermined temperature. In this medium, at temperatures below the predetermined temperature, signals recorded at high density in the recording layer are masked, and the above-mentioned magnetostatic coupling is suppressed, by magnetic masking by the in-plane magnetized layer. At temperatures above the predetermined temperature, however, within a domain forming part of the in-plane magnetized layer, the recording layer and the reproducing layer are magnetostatically coupled, and a recording bit of the recording layer is copied and expanded to a magnetic domain in the reproducing layer. Accordingly, with this medium, by reproducing from an expanded magnetic domain of the reproducing layer, even information from recording bits recorded at high density can be reproduced with high signal quality.

12 Claims, 12 Drawing Sheets

U.S. PATENT DOCUMENTS

| | | | |
|---|---|---|---|
| 5,681,633 | 10/1997 | Onagi et al. | 428/694 ML |
| 5,684,764 | 11/1997 | Hirokane et al. | 369/13 |
| 5,691,072 | 11/1997 | Izumi et al. | 428/64.3 |
| 5,862,105 | 1/1999 | Nishimura | 369/13 |
| 5,863,649 | 1/1999 | Hirokane et al. | 369/13 |
| 5,879,822 | 3/1999 | Okada | 369/13 |

FOREIGN PATENT DOCUMENTS

| | | |
|---|---|---|
| 195 20 627 A1 | 1/1996 | (DE). |
| 0 498 461 A2 | 8/1992 | (EP). |
| 0586175A1 | 3/1994 | (EP). |
| 0619577A1 | 10/1994 | (EP). |
| 0673026A2 | 9/1995 | (EP). |
| 0785545A2 | 7/1997 | (EP). |
| 0 810 594 A2 | 12/1997 | (EP). |
| 2110459 | 6/1983 | (GB). |
| 1-143041 | 6/1989 | (JP). |
| 06325418 | 11/1994 | (JP). |
| 07-307040 | 11/1995 | (JP). |
| 8-7350 | 1/1996 | (JP). |
| 08106662 | 4/1996 | (JP). |
| 08124229 | 5/1996 | (JP). |
| 08180485 | 7/1996 | (JP). |

OTHER PUBLICATIONS

H. Awano, et al., Ultra High Density Magneto–Optical Disk Using Magnetic Domain Expansion Reproducing, published by Abstracts of Papers of Twentieth Japan Applied Magnetics conference (1996), 22pE–4, p. 313.

Copy of Communication dated May 20, 1998, issued by the European Patent Office re corresponding EPA No. 98104044–7.

* cited by examiner

MAGNETO-OPTICAL RECORDING MEDIUM HAVING INTERMEDIATE LAYER OF IN PLANE MAGNETIZATION

This is a divisional application based on U.S. patent application Ser. No. 09/032,985 filed Mar. 2, 1998 now U.S. Pat. No. 6,147,939.

FIELD OF THE INVENTION

The present invention concerns a magneto-optical memory medium, such as a magneto-optical disk, magneto-optical tape, or magneto-optical card, to be used in a magneto-optical recording and reproducing device, and concerns the reproducing method thereof.

BACKGROUND OF THE INVENTION

In the past, the magneto-optical memory medium has been applied as a rewriteable optical memory medium. In this type of magneto-optical memory medium, information recorded in the magneto-optical memory medium is reproduced by focusing thereon a light beam projected by a semiconductor laser. A problem with this type of magneto-optical memory medium is that reproducing characteristics deteriorate if the diameter and interval between recording bits, which are magnetic domains for recording, become too small with respect to the diameter of the light beam.

This problem is caused by inability to distinguish and reproduce individual recording bits, because adjacent recording bits fall within the diameter of the light beam focused on a target recording bit.

In order to solve the foregoing problem, Japanese Unexamined Patent Publication No. 6-150418/1994 (Tokukaihei 6-150418, corresponding to U.S. patent application Ser. No. 08/147,373) (hereinafter referred to as "Conventional Example 1") proposes a magneto-optical memory medium including a non-magnetic intermediate layer provided between a reproducing layer, which has in-plane magnetization at room temperature but changes to perpendicular magnetization with a rise in temperature, and a recording layer, in which the reproducing layer and the recording layer are magnetostatically coupled.

By this means, since areas of the reproducing layer which are magnetized in plane mask information recorded in magnetic domains of the recording layer, individual recording bits can be distinguished and reproduced even if adjacent recording bits fall within the diameter of the focused light beam.

Again, "Magnetic domain expansion readout for amplification of an ultra high density magneto-optical recording signal," *Appl. Phys. Lett.* 69(27), pp. 4257–59 (hereinafter referred to as "Conventional Example 2"), discloses a structure in which a non-magnetic intermediate layer is provided between a reproducing layer and a recording layer. In this structure, by means of a magnetic field produced by the recording layer, the information of the recording layer is copied to a magnetic domain in the reproducing layer larger than the magnetic domain of the recording layer. This conventional art discloses a magnetic domain expansion method, in which, by copying the information of the recording layer to a larger magnetic domain in the reproducing layer, reproducing is carried out through the reproducing layer.

However, with Conventional Example 1, it has been confirmed that, when performing recording and reproducing using even smaller recording bits at closer intervals, the strength of the reproducing signal decreases, and a sufficient reproducing signal cannot be obtained.

Again, a problem with Comparative Example 2 is that, with high recording density, when many recording bits lie beneath a magnetic domain of the reproducing layer, the magnetic fields of multiple recording bits are applied to the reproducing layer, making it impossible for the magnetization of a single target recording bit to be correctly applied to the reproducing layer, leading to deterioration of reproducing signal quality.

Japanese Unexamined Patent Publication No. 1-143041/1989 (Tokukaihei 1-143041) discloses a magneto-optical memory medium in which information written in a recording layer is reproduced by copying it to a larger magnetic domain in a reproducing layer. In this medium, by means of magnetic domain expansion reproducing, the reproducing signal can be strengthened. In addition, Japanese Unexamined Patent Publication No. 8-7350/1996 (Tokukaihei 8-7350) and *Abstracts of Papers of Twentieth Japan Applied Magnetics Conference* (1996), 22pE-4, p. 313 propose a magneto-optical memory medium in which a pulse magnetic field synchronized with the recorded signal is applied during reproducing, to expand the magnetic domain during reproducing and reduce it thereafter, thus increasing the strength of the reproducing signal.

However, with the foregoing conventional art disclosed in Japanese Unexamined Patent Publication No. 1-143041/1989, Japanese Unexamined Patent Publication No. 8-7350/1996, and *Abstracts of Papers of Twentieth Japan Applied Magnetics Conference* (1996), 22pE-4, p. 313, when the interval between recording bits is small, adjacent bits fall within the diameter of the light beam focused on the target bit, the operations of magnetic domain expansion reproducing become unstable, as in the cases of Conventional Examples 1 and 2, and sufficient reproducing signal quality cannot be obtained.

SUMMARY OF THE INVENTION

The present invention was created in order to solve the foregoing problems, and its object is to provide a magneto-optical memory medium and a reproducing method thereof which are able to obtain sufficient reproducing signal quality even when recording and reproducing using a small recording bit diameter and an even smaller interval between recording bits.

In order to attain the object mentioned above, a magneto-optical memory medium according to the present invention comprises a recording layer made of a perpendicularly magnetized film; a reproducing layer which has perpendicular magnetization at least within a signal reproducing domain, and which is magnetically coupled to the recording layer; and a magnetic masking layer provided apart from the reproducing layer, which, at least at room temperature, suppresses magnetic coupling of the recording layer and the reproducing layer.

With the foregoing structure, since, at least at room temperature, the magnetic masking layer suppresses leakage of magnetic flux from the recording layer to the reproducing layer, it becomes possible to eliminate the influence of the magnetization of adjacent magnetic domains during reproducing, and to select information from a desired magnetic domain only, thus realizing increased recording density.

By this means, with the foregoing structure, it becomes possible to perform recording and reproducing operations with a small recording bit diameter and interval, while maintaining sufficient reproducing signal quality.

Another magneto-optical memory medium according to the present invention comprises a recording layer made of a perpendicularly magnetized film; a reproducing layer which has perpendicular magnetization at least within a signal reproducing domain, is magnetically coupled (for example by magnetostatic coupling) to the reproducing layer, and in which a stable reproducing magnetic domain larger than the recording magnetic domains in the recording layer is created by projection of a light beam; and a magnetic masking layer provided apart from the reproducing layer, which, at least at room temperature, suppresses magnetic coupling of the recording layer and the reproducing layer. The signal reproducing domain mentioned above is a domain of the medium which is heated to a reproducing temperature by projection of a light beam.

With the foregoing structure, by forming in the reproducing layer a reproducing magnetic domain larger than the recording magnetic domains of the recording layer, the quantity of the reproducing signal can be increased, thus improving reproducing signal quality.

It is preferable if the magnetic masking layer is made of an in-plane magnetized layer whose magnetization decreases at high temperature.

With this structure, by using an in-plane magnetized layer for the magnetic masking layer, at room temperature, the in-plane magnetized layer captures the magnetic field produced by the recording layer, thus isolating the reproducing layer from the magnetic field of the recording layer.

On the other hand, when heated by projection of a light beam from a reproducing laser, etc., since the magnetization of the in-plane magnetized layer decreases, the above-mentioned isolating effect is lost, and magnetic flux from the recording layer leaks through to the reproducing layer within the heated area, thus giving the reproducing layer perpendicular magnetization conforming to that of the recording layer.

Here, since only the information of the small area heated is transmitted to the reproducing layer, sufficient reproducing signal quality can be obtained even when performing recording and reproducing with small recording bit diameters and intervals.

In this case, it is preferable if, at room temperature, the magnetization of the magnetic masking layer (in-plane magnetized layer) is greater than that of the recording layer.

With this structure, if the magnetization of the magnetic masking layer at room temperature is greater than that of the recording layer, the isolating effect mentioned above can be obtained with greater certainty.

It is preferable if the Curie temperature of the magnetic masking layer is lower than that of the recording layer.

With this structure, heating during reproducing heats the magnetic masking layer to above its Curie temperature, at which point the magnetic masking layer loses its magnetization. In the present case, since it can be ensured that the recording layer is below its Curie temperature when the magnetic masking layer loses its magnetization, the recorded information of the recording layer can be stably maintained.

It is preferable if the Curie temperature of the recording layer is lower than that of the reproducing layer.

With this structure, since superior reproducing characteristics are needed in the reproducing layer, it is advantageous if the reproducing layer has a Curie temperature higher than that of the recording layer.

It is preferable if the magneto-optical memory medium is provided by successively layering on a substrate: a transparent dielectric layer, the reproducing layer, a non-magnetic intermediate layer, the magnetic masking layer, the recording layer, and a protective layer, in that order.

With this structure, a portion of the information recorded in small recording bits in the recording layer can be selected by the magnetic masking layer and reproduced by expansion into a large magnetic domain in the reproducing layer, and therefore a sufficiently strong reproducing signal can be obtained even with high density recording.

Moreover, with the foregoing structure, the non-magnetic intermediate layer can completely shut out exchange coupling between the reproducing layer and the magnetic masking layer, and good magnetostatic coupling between the reproducing layer and the recording layer can be realized.

It is preferable if the thickness of the magnetic masking layer is no less than 2 nm and no more than 40 nm.

With this structure, a good state of masking of the recording layer by the magnetic masking layer can be maintained, and stable magnetic domain expansion reproducing is possible.

It is preferable if the magnetic masking layer is made of one of the alloys: GdFe alloy, GdFeAl alloy, GdFeTi alloy, GdFeTa alloy, GdFePt alloy, GdFeAu alloy, GdFeCu alloy, GdFeAlTi alloy, GdFeAlTa alloy, NdFe alloy, NdFeAl alloy, DyFe alloy, and DyFeAl alloy.

Use of one of the foregoing alloys makes possible stable formation of a magnetic domain in the reproducing layer and suitable response to the magnetic field from the recording layer, and good magnetic domain expansion reproducing can be realized.

The magnetic masking layer may also have a composition as shown by the formula $(Gd_{0.11}Fe_{0.89})_X Al_{1-X}$, where X (atom ratio) is no less than 0.30 and no more than 1.00.

With this composition, since the magnetic masking layer has the most suitable magnetic characteristics, in reproducing, good exchange coupling between the recording layer and reproducing layer can be realized, and stable magnetic domain expansion reproducing can be realized.

It is preferable if the Curie temperature of the magnetic masking layer is no less than 60° C., and no more than 220° C.

With this structure, since the magnetic masking layer has the most suitable Curie temperature, at temperatures below the Curie temperature of the magnetic masking layer, the magnetic masking layer blocks (magnetically masks) the magnetization of the recording layer, and at temperatures above the Curie temperature of the magnetic masking layer, good magnetostatic coupling of the recording layer and reproducing layer can be maintained, and stable magnetic domain expansion reproducing can be realized.

Alternatively, the above-mentioned magnetic masking layer may be a magnetic layer in which, at room temperature, the direction of total magnetization is opposite the direction of total magnetization of the recording layer.

With this structure, since the magnetic field which is produced by the recording layer and which influences the reproducing layer can be reduced, the direction of magnetization of the reproducing layer is determined only by the influence of the recording bit at the center of the light beam spot, thus making possible stable reproducing using smaller recording bit intervals and smaller recording bit diameters.

In this case, it is preferable if the recording layer is made of a rare earth-transition metal alloy film which is transition metal rich within a range from room temperature to the Curie temperature, and if the magnetic masking layer (magnetic layer) is a perpendicularly magnetized film made of a rare earth-transition metal alloy which is rare earth metal rich at least at room, temperature, and which is provided so that the direction of magnetization of its transition metal sub-lattice conforms to the direction of magnetization of the transition metal sub-lattice of the recording layer.

With this structure, since the rare earth metal rich magnetic masking layer is provided adjacent to the transition metal rich recording layer, by reducing the magnetic field produced by the recording layer in the low-temperature areas, the direction of magnetization of the reproducing layer during reproducing is determined by only the influence of the recording bit at the center of the light beam spot, thus making possible stable reproducing using smaller recording bit intervals and smaller recording bit diameters.

It is also preferable if the magnetic masking layer is a magnetic film whose magnetization is reduced at high temperature.

With this structure, in the low-temperature area, leakage of magnetic flux from the recording layer to the reproducing layer can be suppressed, and in the high-temperature area, on the other hand, the magnetic flux of the recording layer can be leaked to the reproducing layer. Accordingly, with this structure, the direction of magnetization of the reproducing layer can be determined with certainty by the information from a single recording bit on the recording layer, and reproducing signal quality can be improved.

It is preferable if the total magnetization of the magnetic masking layer at room temperature is substantially equal to the total magnetization of the recording layer at room temperature.

With this structure, the action of the magnetic field of the recording layer on the reproducing layer can be suppressed within the low-temperature area, and thus reproducing signal quality can be further improved.

It is preferable if the Curie temperature of the magnetic masking layer is lower than that of the recording layer.

With this structure, during reproducing, the magnetic masking layer can be heated to around its Curie temperature, thus reducing its magnetization, while at the same temperature, the recording layer maintains the information recorded therein.

It is preferable if the compensation temperature of the magnetic masking layer is lower than the Curie temperature of the recording layer.

With this structure, during reproducing, the magnetic masking layer, which is an isolating layer, can be heated to the vicinity of its compensation temperature, thus reducing its magnetization, while at the same temperature, the recording layer maintains the information recorded therein.

It is preferable if the magneto-optical memory medium is provided by successively layering on a substrate: a transparent dielectric layer, the reproducing layer, a non-magnetic intermediate layer, the magnetic masking layer, the recording layer, and a protective layer, in that order.

With this structure, a portion of the information recorded in small recording bits in the recording layer can be selected by the magnetic masking layer (isolating layer), expanded into a large magnetic domain in the reproducing layer, and reproduced stably. Moreover, the non-magnetic intermediate layer can completely shut out exchange coupling between the reproducing layer and the magnetic masking layer and recording layer, and good magnetostatic coupling between the reproducing layer and the magnetic masking layer and recording layer can be realized.

In this case, it is preferable if the thickness of the magnetic masking layer is no less than 10 nm and no more than 60 nm.

With this structure, the magnetic masking layer's (isolating layer's) effect of masking the reproducing layer from the magnetic field of the recording layer can be further improved, and, since the thickness of the reproducing layer is most suitable, a good reproducing signal can be obtained.

Alternatively, it is preferable if the magneto-optical memory medium is provided by successively layering on a substrate: a transparent dielectric layer, the reproducing layer, a non-magnetic intermediate layer, the recording layer, the magnetic masking layer (the magnetic layer, which is an isolating layer), and a protective layer, in that order.

With this structure, a portion of the information recorded in small recording bits in the recording layer can be selected by the magnetic masking layer (isolating layer), expanded into a large magnetic domain in the reproducing layer, and reproduced stably. Moreover, the non-magnetic intermediate layer can completely shut out exchange coupling between the reproducing layer and the magnetic masking layer and recording layer, and good magnetostatic coupling between the reproducing layer and the magnetic masking layer and recording layer can be realized.

Further, with this structure, by providing the magnetic masking layer in the foregoing order, in the signal reproducing domain, it is easier to copy the magnetic domain from the recording layer to the reproducing layer, and the range of possible thicknesses of the magnetic masking layer can be increased.

In this case, it is preferable if the thickness of the magnetic masking layer is no less than 10 nm and no more than 80 nm.

With this structure, the magnetic masking layer's effect of masking the reproducing layer from the magnetic field of the recording layer can be enhanced, and good reproducing signal quality can be obtained.

It is preferable if the magnetic masking layer is made of one of the alloys: GdDyFe alloy, TbFe alloy, DyFe alloy, GdFe alloy, GdTbFe alloy, DyFeCo alloy, and TbFeCo alloy.

By using one of these alloys, the magnetic masking layer's effect of masking the reproducing layer from the magnetic field of the recording layer can be enhanced, and good reproducing signal quality can be obtained.

It is preferable if the Curie temperature of the magnetic masking layer is set to no less than 80° C. and no more than 220° C.

This structure can, in the low-temperature area, further improve the effect of the magnetic masking layer (which is an isolating layer) of masking the reproducing layer from the magnetic field of the recording layer, and, in the high-temperature area (around the reproducing temperature), can leak the magnetic field of the recording layer through to the reproducing layer. For these reasons, with this structure, good reproducing signal quality can be obtained.

It is preferable if the compensation temperature of the magnetic masking layer is set to no less than 80° C. and no more than 220° C.

This structure can, in the low-temperature area, further improve the effect of the magnetic masking layer (which is an isolating layer) of masking the reproducing layer from the magnetic field of the recording layer, and, in the high-temperature area (around the reproducing temperature), can leak the magnetic field of the recording layer through to the reproducing layer. For these reasons, with this structure, good reproducing signal quality can be obtained.

Alternatively, the magnetic masking layer may be a magnetic film which has in-plane magnetization at room temperature, and perpendicular magnetization above a predetermined temperature, which is the temperature above which it is heated in reproducing.

With this structure, at room temperature, the magnetic masking layer can absorb the magnetic field produced by the recording layer, and isolate the reproducing layer from the magnetic field produced by the recording layer.

Moreover, the portion of the magnetic masking layer heated by projection of a light beam from a reproducing laser, etc. is heated to around its compensation temperature, shows perpendicular magnetization, and thus loses its above-mentioned isolating effect. As a result, in the heated area, magnetic flux from the recording layer leaks through to the reproducing layer, and the reproducing layer can be given a perpendicular magnetization conforming to that of the recording layer.

Here, since only information in the small area heated is transmitted to the reproducing layer, sufficient reproducing signal quality can be obtained even when using a small recording bit diameter and a small recording bit interval.

In this case, it is preferable if the Curie temperature of the magnetic masking layer (magnetic film) is set lower than that of the recording layer.

With this structure, during recording of information, influence of the magnetic masking layer on the recording layer can be avoided, and thus the information can be recorded in the recording layer with certainty.

It is preferable if the Curie temperature of the recording layer is lower than that of the reproducing layer.

With this structure, since superior reproducing characteristics are needed in the reproducing layer, it is advantageous if the reproducing layer has a Curie temperature higher than that of the recording layer.

It is preferable if the magneto-optical memory medium is provided by successively layering on a substrate: a transparent dielectric layer, the reproducing layer, a non-magnetic intermediate layer, the magnetic masking layer (the magnetic film, which is an isolating layer), the recording layer, and a protective layer, in that order.

With this structure, a portion of the information recorded in small recording bits in the recording layer can be selected by the magnetic masking layer (isolating layer), expanded into a large magnetic domain in the reproducing layer, and reproduced stably. As a result, with this structure, a sufficiently strong reproducing signal can be obtained even with high density recording.

Moreover, the non-magnetic intermediate layer can completely shut out exchange coupling between the reproducing layer and the magnetic masking layer and recording layer, and good magnetostatic coupling between the reproducing layer and the magnetic masking layer and recording layer can be realized.

In this case, it is preferable if the thickness of the magnetic masking layer is no less than 2 nm and no more than 40 nm.

With this structure, the magnetic masking layer's (in-plane magnetized layer's) effect of masking of the recording layer is optimized. Further, stable magnetic domain expansion reproducing is possible.

It is preferable if the magnetic masking layer is made of one of the alloys: GdDyCo alloy, GdNdFe alloy, GdNdFeCo alloy, GdTbFe alloy, GdTbFeCo alloy, GdDyFeCo alloy, GdDyFe alloy, and GdFe alloy.

With this structure, it is possible to produce a stable magnetic domain in the reproducing layer, and to respond correctly to the magnetic field from the recording layer, and thus good magnetic domain expansion reproducing can be realized.

It is preferable if the composition of the magnetic masking layer is as shown by the formula $Gd_X(Fe_{0.80}Co_{0.20})_{1-X}$, and if X (atom ratio) is no less than 0.22 and no more than 0.35.

With this composition, since the magnetic masking layer has the most suitable magnetic characteristics, good exchange coupling between the recording layer and the magnetic masking layer, and good magnetic domain expansion reproducing, can be realized.

In a magneto-optical memory medium provided with an in-plane magnetized layer as the magnetic masking layer, and with a non-magnetic intermediate layer, it is preferable if the thickness of the reproducing layer is no less than 10 nm, and no more than 80 nm.

With this structure, by setting the thickness of the reproducing layer within the foregoing range, the magnetic domain in the reproducing layer can be stabilized, and the light interference effect is maximized, and thus good reproducing signal quality can be obtained.

In this case, it is preferable if the thickness of the non-magnetic intermediate layer is no less than 1 nm and no more than 80 nm.

With this structure, since the thickness of the non-magnetic intermediate layer is most suitable, a good state of magnetostatic coupling is realized, enabling magnetic ultra high resolution reproducing, and the optical interference effect is also increased.

In this case, a reflective layer may also be provided adjacent to the non-magnetic intermediate layer on the surface thereof which faces the recording layer.

With this structure, by providing the reflective layer, in addition to the Kerr effect due to reflection of the reproducing light beam from the reproducing layer, the Faraday effect due to reflection of light passing through the reproducing layer can also be utilized. As a result, with this structure, better reproducing signal quality can be assured even if the thickness of the reproducing layer is reduced.

Moreover, with this structure, since the reproducing light beam passing through the reproducing layer is reflected by the reflective layer, reproducing of information from the recording layer, which is unnecessary for signal reproducing, can be optically shut out, and signal reproducing characteristics are improved.

In this case, it is preferable if the reflective layer is made of Al, and if its thickness is no less than 2 nm and no more than 40 nm.

With this structure, by setting the thickness of the reflective layer within the foregoing range, the Al reflective layer has the most suitable thickness. Accordingly, the reproducing light beam is reflected from the reflective layer, thus improving signal reproducing characteristics of magnetic ultra high resolution reproducing, and it becomes possible to maintain in a good state the magnetostatic coupling force between the reproducing layer and the recording layer.

It is preferable if the reflective layer is made of an alloy of Al and a magnetic metal.

With this structure, since the alloy has lower heat conductivity than Al alone, the temperature of the medium when heated by the light beam (laser beam) can be given a steep distribution. For this reason, good magnetic amplification reproducing can be realized, and the magnetic characteristics of the recording layer formed on the reflective layer are improved, thus enabling provision of a magneto-optical memory medium capable of erasure using a smaller erasure magnetic field.

In this case, it is preferable if the composition of the reflective layer is as shown by the formula $Al_{1-X}Fe_X$, and if X (atom ratio) is no less than 0.02 and no more than 0.50.

With this structure, good magnetic amplification reproducing can be realized, and the magnetic characteristics of the recording layer formed on the reflective layer are improved, thus enabling provision of a magneto-optical memory medium capable of erasure using a smaller erasure magnetic field.

The reflective layer may also have a composition as shown by the formula $Al_{1-X}Ni_X$, where X (atom ratio) is no less than 0.02 and no more than 0.50.

With this structure, good magnetic amplification reproducing can be realized, and the magnetic characteristics of the recording layer formed on the reflective layer are improved, thus enabling provision of a magneto-optical memory medium capable of erasure using a smaller erasure magnetic field.

Alternatively, the reflective layer may be made of an alloy of Al and a non-magnetic metal.

With this structure, good magnetic amplification reproducing can be realized, and the magnetic characteristics of the recording layer formed on the reflective layer are improved, thus enabling provision of a magneto-optical memory medium capable of erasure using a smaller erasure magnetic field.

In this case, it is preferable if the above-mentioned non-magnetic metal is one of the chemical elements: Ti, Ta, Pt, Au, Cu, and Si.

With this structure, good magnetic amplification reproducing can be realized, and the magnetic characteristics of the recording layer formed on the reflective layer are improved, thus enabling provision of a magneto-optical memory medium capable of erasure using a smaller erasure magnetic field.

It is also preferable if the above-mentioned alloy of Al and a non-magnetic metal has a composition as shown by the formula $Al_{1-X}Ti_X$, and if X (atom ratio) is no less than 0.02 and no more than 0.98.

With this structure, good magnetic amplification reproducing can be realized, and the magnetic characteristics of the recording layer formed on the reflective layer are improved, thus enabling provision of a magneto-optical memory medium capable of erasure using a smaller erasure magnetic field.

In a magneto-optical memory medium provided with an in-plane magnetized layer as the magnetic masking layer, and with a non-magnetic intermediate layer, a heat-dissipating layer may be provided on the surface of the protective layer which faces away from the substrate.

With this structure, by providing the heat-dissipating layer, the temperature distribution of the magneto-optical memory medium when heated by the light beam (laser beam) is steeper. As a result, by means of this steep temperature distribution, this structure can enhance the effect of the magnetic masking layer of masking the reproducing layer from the magnetic field of the recording layer, thus further improving reproducing characteristics.

In a magneto-optical memory medium provided with reproducing layer, recording layer, and magnetic masking layer, it is preferable if the reproducing layer has in-plane magnetization at room temperature, and has perpendicular magnetization at a higher temperature.

With this structure, since the reproducing layer has in-plane magnetization at room temperature, reproducing of unnecessary signals from the reproducing layer can be suppressed, thus improving reproducing signal quality. In other words, it is possible that the entire area of the reproducing layer outside the magnetic domain formed therein may become a noise component, but if, as here, a reproducing layer having in-plane magnetization at room temperature is used, only the magnetic domain copied from the recording layer has perpendicular magnetization, and it is possible to reproduce the signal of only the perpendicularly magnetized area.

It is also preferable if the reproducing layer is a multi-layered film made of alternating layers of Co and Pt.

With this structure, by means of the multi-layered film, a good CNR (carrier-to-noise ratio) can be obtained even when using a short-wavelength laser as the light beam.

A reproducing method according to the present invention is a method of reproducing information from the foregoing magneto-optical memory medium provided with a reproducing layer, a recording layer, and a magnetic masking layer, and includes a step in which, during reproducing, a light beam is projected in pulses onto the magneto-optical memory medium.

With the foregoing method, in order to contribute to smooth reproducing operations by reproducing and then erasing each magnetic domain formed in the reproducing layer during reproducing of information from the magneto-optical memory medium, the reproducing light beam (laser beam) emits pulses. By this means, it is possible to erase the magnetic domain when the light beam is off, and, when the light beam is on, to raise the temperature of the medium, copy the magnetic domain of the recording layer to the reproducing layer, and reproduce the signal. Thus the quality of signal reproducing may be increased.

The reproducing method according to the present invention may also include a step in which, during reproducing, a light beam is projected onto the magneto-optical memory medium, and the magnetic masking layer is heated to above its Curie temperature. This reproducing method is especially preferable when the magnetic masking layer of the magneto-optical memory medium is made of an in-plane magnetized layer whose magnetization decreases at high temperatures.

With the foregoing method, when reproducing information from the magneto-optical memory medium, if the magnetic masking layer is heated to above its Curie temperature, it loses its magnetization, and the magnetization of the recording layer can be smoothly copied to the reproducing layer during reproducing.

The reproducing method according to the present invention may also include a step in which, during reproducing, a light beam is projected onto the magneto-optical memory medium, and the magnetic masking layer is heated to above a predetermined temperature. This reproducing method is especially preferable when the magnetic masking layer of the magneto-optical memory medium is made of a magnetic film which has in-plane magnetization at room temperature, and has perpendicular magnetization above the predetermined temperature.

With the foregoing method, when reproducing information from the magneto-optical memory medium, if the magnetic masking layer is heated to above the predetermined temperature at which it shifts to perpendicular magnetization, the magnetization of the recording layer can be smoothly copied to the reproducing layer during reproducing.

It is preferable if the magneto-optical memory medium is provided by successively layering on a substrate: a transparent dielectric layer, the reproducing layer, a first non-magnetic intermediate layer, the magnetic masking layer, a second non-magnetic masking layer, the recording layer, and a protective layer, in that order.

With this structure, a portion of the information recorded in small recording bits in the recording layer can be selected by the magnetic masking layer and reproduced by expansion into a large magnetic domain in the reproducing layer.

Moreover, by providing the second non-magnetic intermediate layer between the magnetic masking layer and the recording layer, exchange coupling between the magnetic masking layer and the recording layer can be blocked, and thus a larger masking effect and good signal strength can be obtained.

It is preferable if the thickness of the second non-magnetic intermediate layer is no less than 2 nm and no more than 80 nm.

With this structure, by setting the thickness of the second non-magnetic intermediate layer within a range from 2 nm to 80 nm, good transfer of the bit information from the recording layer to the reproducing layer is obtained, and the masking effect of the magnetic masking layer is optimized.

Additional objects, features, and strengths of the present invention will be made clear by the description below. Further, the advantages of the present invention will be evident from the following explanation in reference to the drawings.

EMBODIMENTS

FIRST EMBODIMENT

The first embodiment of the present invention will be explained in detail below with reference to the drawings.

Figure 1:
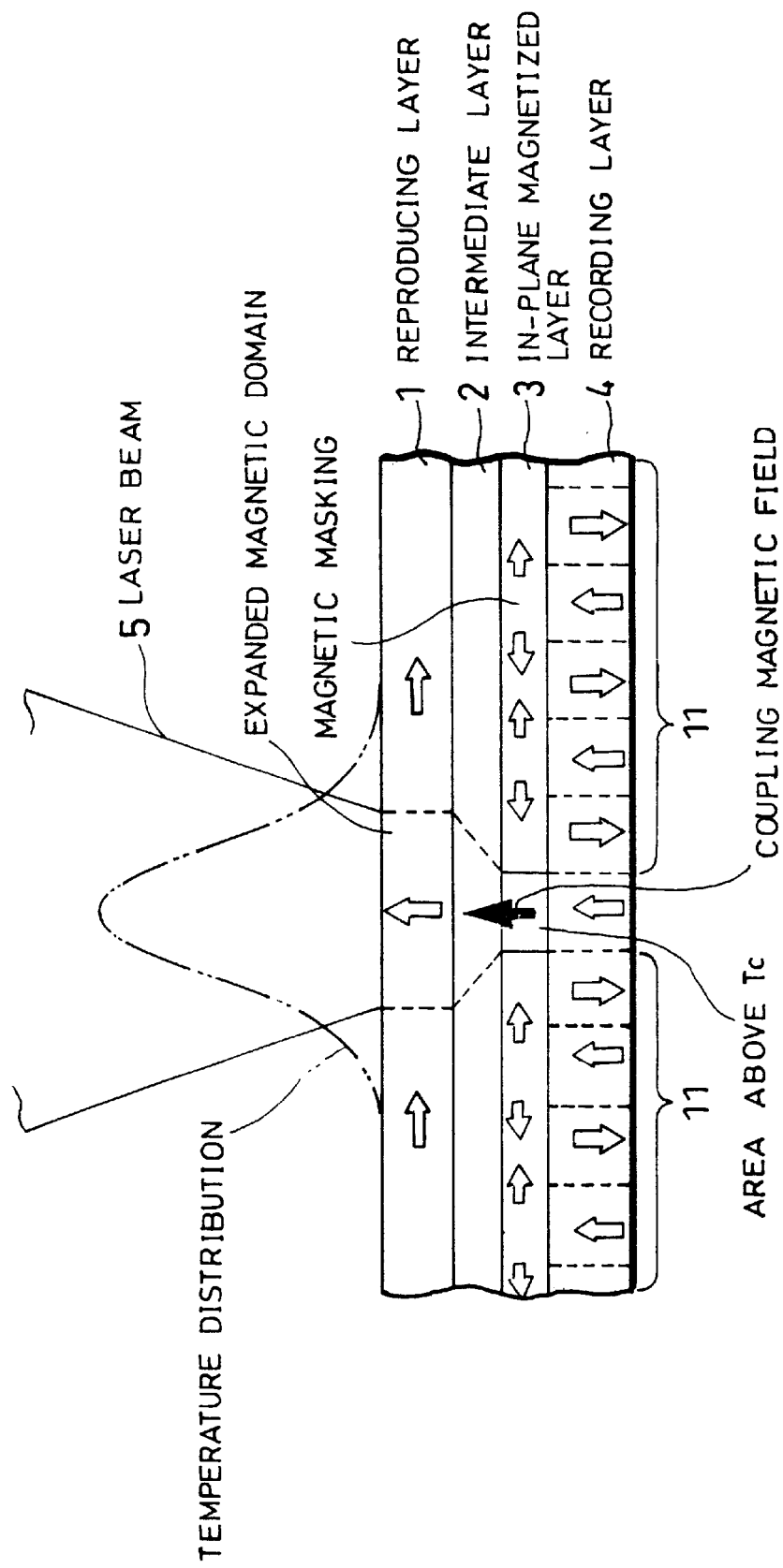
FIG. 1 is a drawing explaining the reproducing principle of magneto-optical disks according to the first through sixth embodiments of the present invention.
Figure 16:
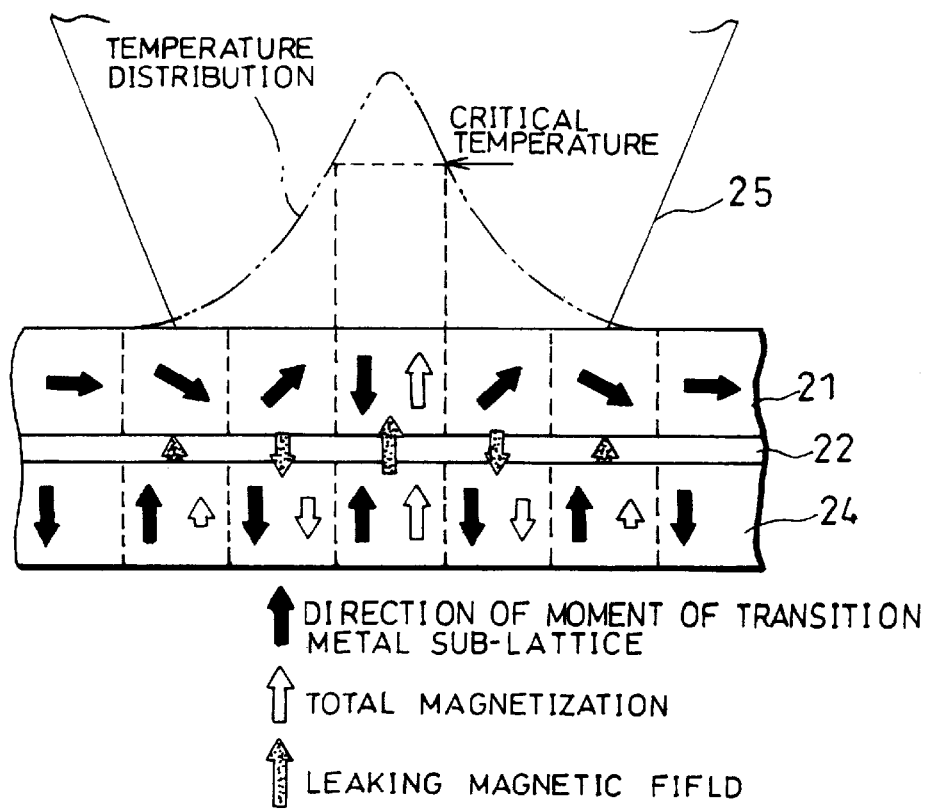
FIG. 16 is a drawing explaining the reproducing principle of a conventional ultra high resolution memory medium.

FIG. 1 is a cross-sectional view of a magneto-optical memory medium showing the reproducing principle in a magneto-optical disk according to the present invention, and FIG. 16 is a cross-section of a magneto-optical memory medium showing the reproducing principle of a conventional magneto-optical disk.

Figure 15:
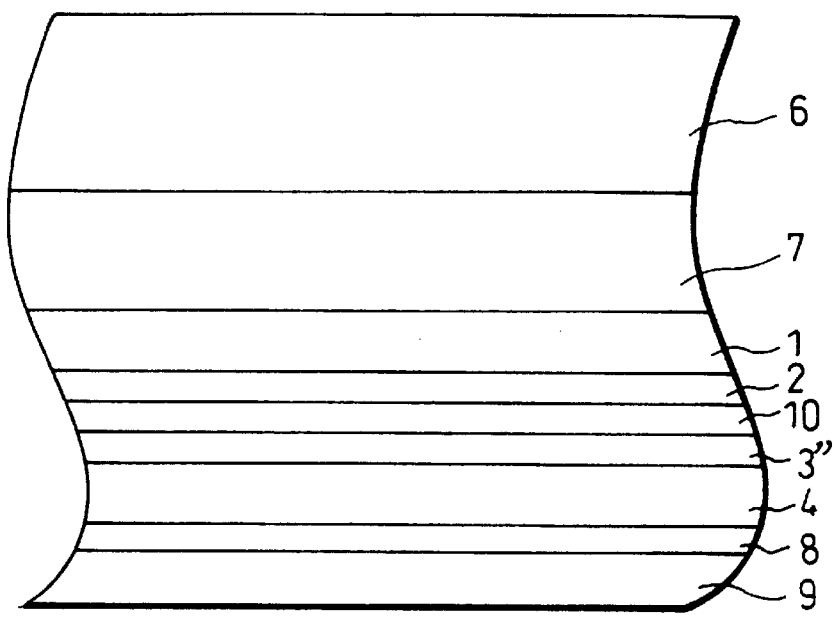
FIG. 15 is a schematic cross-sectional drawing showing the structure of layers in a magneto-optical disk according to the thirteenth embodiment of the present invention.

First, conventional ultra high resolution reproducing operations will be explained. In the conventional reproducing method, as shown in FIG. 15, a magnetic field produced by a recording layer 24 is applied to and copied to a reproducing layer 21. For this reason, a non-magnetic intermediate layer 22 is provided between the reproducing layer 21, which is made of a rare earth-transition metal alloy which has perpendicular magnetization at least when its temperature rises, and the recording layer 24, which is made of a rare earth-transition metal alloy which has a compensation temperature of room temperature. Further, the recording layer 24 and the reproducing layer 21 are magnetostatically coupled.

When a light beam 25 is focused and projected onto the medium from the reproducing layer 21 side, a temperature distribution having a Gaussian distribution in accordance with the intensity distribution of the light beam 25 is formed in the medium. In accompaniment with the formation of this temperature distribution, the magnetization of the recording layer 24 increases, increasing the magnetic field produced thereby, and this magnetic field determines the direction of magnetization of the reproducing layer 21. In other words, the magnetization of the recording layer 24 is copied to the reproducing layer 21. Ultra high resolution reproducing operations are realized by reproducing the information in the copied area.

Figure 2A:
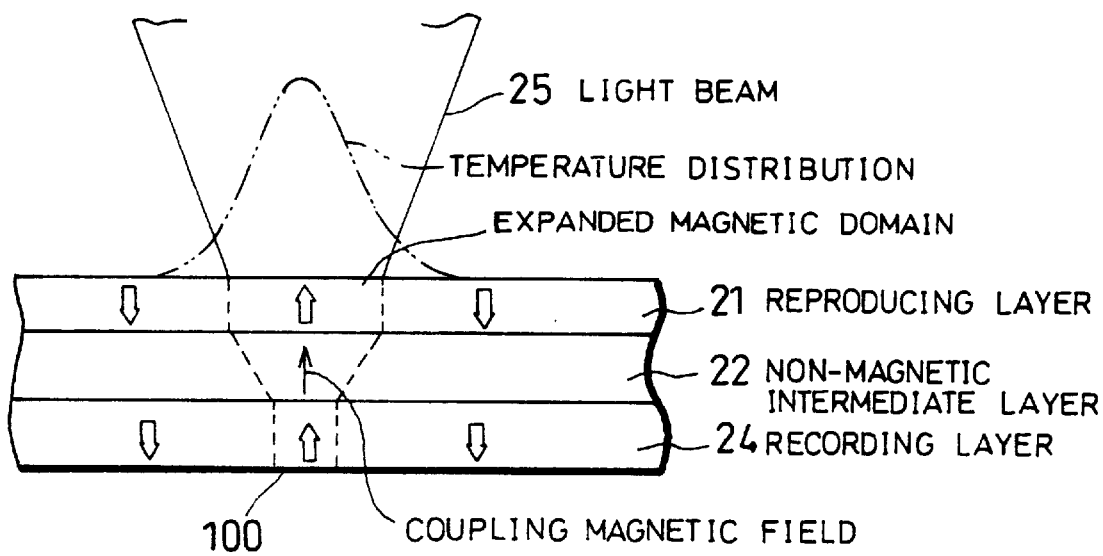
FIG. 2(a) is a drawing explaining a conventional magneto-optical disk capable of expanded magnetic domain reproducing.

In this reproducing method, if the size of the magnetic domain existing on the reproducing layer 21 is set, as shown in FIG. 2(a), to around the beam spot size of the reproducing laser (approximately 1 μm for a laser with 680 nm wavelength), and to a size larger than the magnetic domains of the recording layer 24, the signal produced by the reproducing layer 21 during reproducing is increased.

Figure 2B:
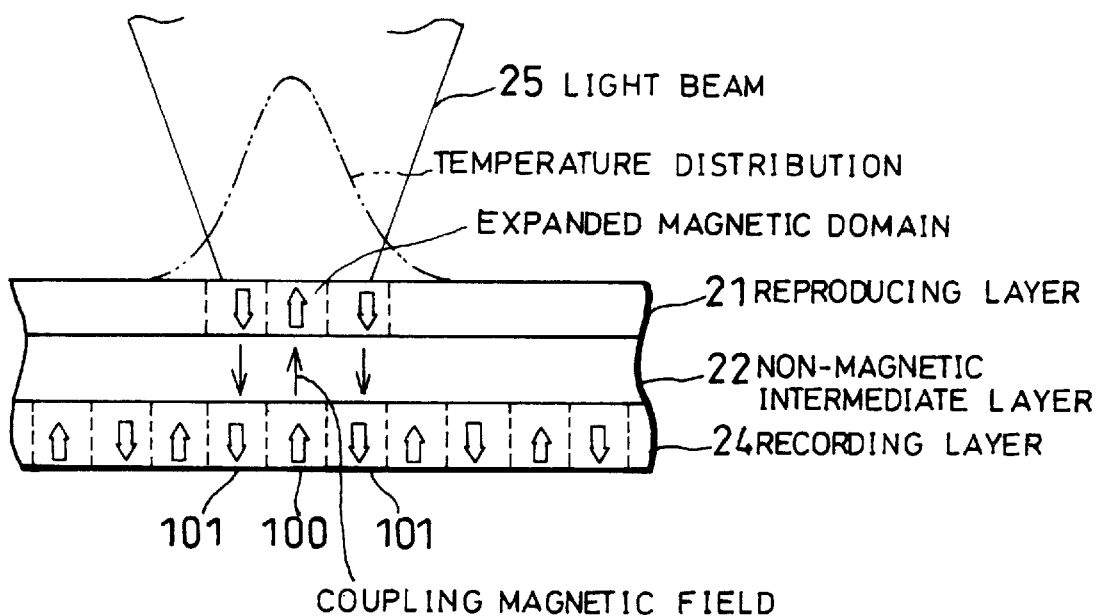
FIG. 2(b) is a drawing explaining problems with the conventional magneto-optical disk shown in FIG. 2(a).

However, since the direction of magnetization of the reproducing layer 21 is determined by the magnetic field from the recording layer 24, when information is recorded in the recording layer 24 at high density, copying of the magnetization therefrom does not go well, as explained below. This structure functions effectively when, as shown in FIG. 2(a), an isolated bit 100 is formed in an otherwise blank recording layer 24, because the direction of perpendicular magnetization of the reproducing layer 21 is influenced only by the magnetic field from the isolated bit 100. However, in high density recording, as shown in FIG. 2(b), there is also influence from adjacent bits 101. Since the direction of magnetization of adjacent bits 101 may be opposite that of the recording bit 100, the target magnetization to be a reproduced is weakened, and there are cases in which it becomes markedly difficult to copy and expand the target magnetization. As a result, the information of the target bit cannot be reproduced correctly, and the medium is easily influenced by external floating magnetic fields, etc.

In contrast, the magnetic domain expansion magneto-optical memory medium according to the present invention, as shown in FIG. 1, is provided with an in-plane magnetized layer 3 (referred to in the claims as the "magnetic masking layer") next to a recording layer 4, and the in-plane magnetized layer 3 masks the magnetization of low-temperature areas 11 of the recording layer 4, which are not heated to above a predetermined temperature (hereinafter referred to as the "critical temperature"). Here, the in-plane magnetized layer 3 prevents the magnetization of the low-temperature areas 11 of the recording layer 4 from influencing the reproducing layer 3. In other words, it prevents the magnetic flux produced by the low-temperature areas 11 from leaking to the reproducing layer 1. In short, the in-plane magnetized layer 3 suppresses the magnetic coupling force of the recording layer 4 and the reproducing layer 1.

The masking effect of the in-plane magnetized layer 3 can be made use of even if the in-plane magnetized layer 3 is not provided between the reproducing layer 1 and the recording layer 4. This is due to the following effect. Since the in-plane magnetized layer 3 adjacent to the recording layer 4 has in-plane magnetization within a temperature range from room temperature to just below the reproducing temperature, a closed magnetic circuit can easily be formed between the recording layer 4 and the in-plane magnetized layer 3. Accordingly, within the foregoing temperature range, almost all of the magnetic field from the recording layer 4 passes through the in-plane magnetized layer 3, and thus this magnetic field can be prevented from reaching the reproducing layer 1.

By realizing magnetic masking in this way, it is possible to remove masking from only that area heated to above the critical temperature. Accordingly, even when, as in FIG. 1, the magnetic domain existing on the reproducing layer 1 is larger than the magnetic domains of the recording layer 4, it becomes possible to reproduce only the information of a desired magnetic domain on the recording layer 4 with a temperature above the critical temperature.

Here, in order to make effective use of magnetostatic coupling between the recording layer 4 and the reproducing layer 1 in the area heated to above the critical temperature, it is preferable if the in-plane magnetized layer 3 has no magnetization at temperatures above the critical temperature, or if its magnetization at such temperatures is smaller than its magnetization below the critical temperature. It is also preferable if the Curie temperature of the in-plane magnetized layer 3 is lower than that of the recording layer 4. Further, in order to prevent magnetic flux from the recording layer 4 from influencing the reproducing layer 1 at room temperature, it is preferable if, at room temperature, the magnetization of the in-plane magnetized layer 3 is larger than that of the recording layer 4.

It is preferable if the size of the magnetic domain in the reproducing layer 1 during reproducing by the laser beam is large, because the signal quantity is increased, and there is less cause of noise. Further, since the magnetic domain walls of the reproducing layer 1 must move in response to the magnetic field from the recording layer 4, low coercive force is advantageous.

In addition, when reproducing information from the present magneto-optical memory medium, smoother reproducing operations can be obtained by successively forming, reproducing, and erasing the magnetic domains of the reproducing layer 1. For this reason, if the reproducing laser beam emits pulses, it is possible to erase the magnetic domain when the laser is off, and, when the laser emits light, to raise the temperature of the medium, copy the magnetic domain of the recording layer 4 to the reproducing layer 1, and reproduce the signal. Thus the quality of signal reproducing may be increased.

Next, the first embodiment of the present invention will be explained in more detail, with reference to FIG. 3. The following will explain a case in which the magneto-optical memory medium is embodied as a magneto-optical disk.

Figure 3:
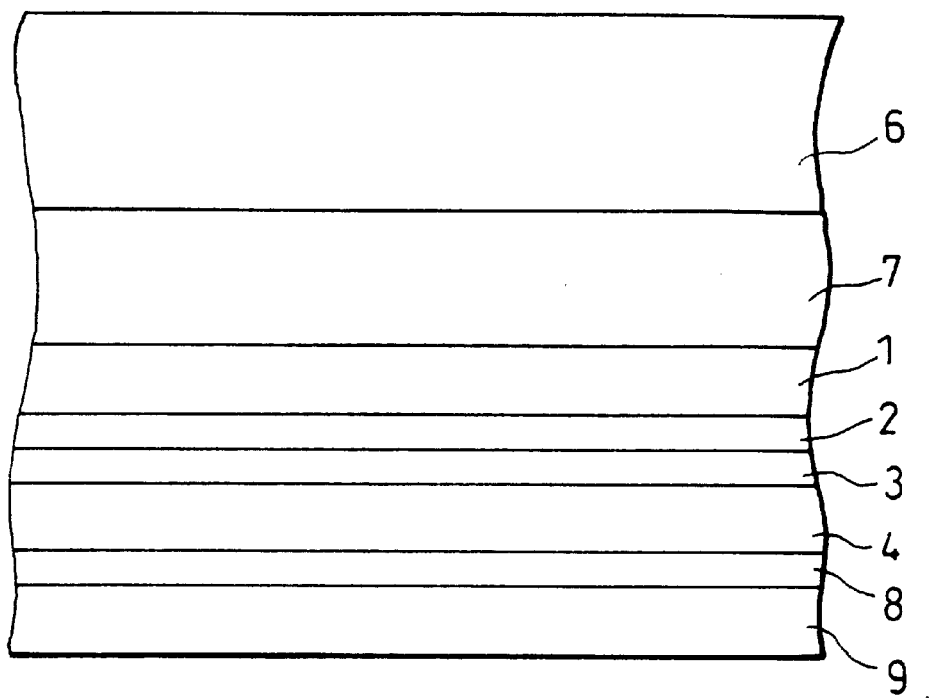
FIG. 3 is a schematic cross-sectional drawing showing the structure of layers in a magneto-optical disk according to the first embodiment of the present invention.

As shown in FIG. 3, a magneto-optical disk according to the present embodiment includes a substrate 6, a transparent dielectric layer 7, a reproducing layer 1, a non-magnetic intermediate layer 2, an in-plane magnetized layer 3, a recording layer 4, a protective layer 8, and an overcoat layer 9, layered together in that order to make up a disk main body.

In a magneto-optical disk of this type, the recording method used is the Curie temperature recording method. An objective lens is used to focus onto the reproducing layer 1 a light beam 5 emitted by a semiconductor laser, and recording and reproducing are carried out by means of a magneto-optical effect known as polar Kerr effect. This polar Kerr effect is a phenomenon in which magnetization which is perpendicular to a surface onto which light is projected causes the direction of revolution of the plane of polarization of light reflected therefrom to revolve, whereby the direction of revolution changes depending on the direction of magnetization of the reproducing layer 1.

The substrate 6 is made of a transparent, i.e., light-transmitting, base material such as polycarbonate, and is provided in a disk shape.

The transparent dielectric layer 7 is preferably made of a material with large refractive index, such as AlN, SiN, AlSiN, $TiO_2$, etc. The thickness of the transparent dielectric layer 7 must be set so as to realize a suitable interference effect with respect to the light beam 5, and so as to increase the Kerr revolution angle of the medium. Accordingly, the thickness of the transparent dielectric layer 7 is set to around ($\lambda/4n$), where $\lambda$ is the wavelength of the light beam 5 (reproducing light), and n is the refractive index of the transparent dielectric layer 7. For example, if the wavelength of the laser light is 680 nm, the thickness of the transparent dielectric layer 7 may be set to around 30 nm to 100 nm.

The reproducing layer 1 is a magnetic film made of an alloy of rare earth and transition metals, and its composition is adjusted so that it has magnetic characteristics whereby it is magnetized in plane at room temperature, and shifts to perpendicular magnetization in accompaniment with an increase in temperature.

The non-magnetic intermediate layer 2 is made of a single layer of a dielectric material such as AlN, SiN, or AlSiN, or of a single layer of a non-magnetic metal such as Al, Ti, or Ta, or of two layers, one of dielectric material and one of non-magnetic metal. The total thickness of the non-magnetic intermediate layer 2 is set to 1 nm to 80 nm, so that the reproducing layer 1 and the recording layer 4 will be magnetostatically coupled.

The in-plane magnetized layer 3 is a magnetic film chiefly composed of a rare earth-transition metal alloy, or of rare earth metals, or of transition metals, and is magnetized in a direction parallel to the surface of the film (an in-plane direction). The composition of the in-plane magnetized layer 3 is adjusted so as to satisfy the following conditions discussed above in the explanation of FIG. 1. Namely, at temperatures below the critical temperature, the in-plane magnetization of the in-plane magnetized layer 3 masks the magnetic field produced by the perpendicular magnetization of the recording layer 4, thus preventing leakage of the magnetic field to the reproducing layer 1; but, at temperatures above the critical temperature, the in-plane magnetized layer 3 loses its magnetic masking effect, thus making it easier for the magnetic flux produced by the recording layer 4 to pass through to the reproducing layer 1.

The recording layer 4 is a perpendicularly magnetized film made of an alloy of rare earth and transition metals, and its thickness is set within a range from 20 nm to 80 nm.

The protective layer 8 is made of a dielectric material such as AlN, SiN, AlSiN, or SiC, or of an alloy of non-magnetic metals such as Al, Ti, Ta, etc. The protective layer 8 serves to prevent oxidation of the rare earth-transition metal alloys used in the reproducing layer 1, recording layer 4, etc., and its thickness is set to within a range from 5 nm to 60 nm.

The overcoat layer 9 is made of a UV-hardened resin or heat-hardened resin coated onto the remainder of the disk main body by spin coating, and then hardened by applying ultraviolet light or heat.

The following will explain (1) the method of formation, and (2) the recording and reproducing characteristics of a concrete example of a magneto-optical disk with the foregoing structure.

(1) Method of Formation

First, a pre-grooved and pre-pitted substrate 6 made of disk-shaped polycarbonate was placed in a substrate holder in a sputtering device supplied with an Al target, a GdFeCo alloy target, a GdFeAl alloy target, and a GdDyFeCo alloy target. After evacuating the interior of the sputtering device to $1\times10^{-6}$ Torr, a mixed gas of argon and nitrogen was introduced, a voltage was supplied to the Al target, and, under a gas pressure of $4\times10^{-3}$ Torr, a transparent dielectric layer 7 made of AlN, with a thickness of 80 nm, was formed on the substrate 6. Incidentally, 1 Torr is 133.3 Pa.

Next, after again evacuating the interior of the sputtering device to $1\times10^{-6}$ Torr, argon gas was introduced, a voltage was supplied to the GdFeCo alloy target, and, under a gas pressure of $4\times10^{-3}$ Torr, a reproducing layer 1 made of $Gd_{0.30}(Fe_{0.80}Co_{0.20})_{0.70}$, with a thickness of 20 nm, was formed on the transparent dielectric layer 7. The reproducing layer 1 produced had characteristics whereby it was magnetized in-plane at room temperature, and shifted to perpendicular magnetization at 120° C. The reproducing layer 1 had a compensation temperature of 300° C., and a Curie temperature of 320° C.

Next, a mixed gas of argon and nitrogen was introduced, a voltage was applied to the Al target, and, under a gas pressure of $4\times10^{-3}$ Torr, a non-magnetic intermediate layer 2 made of AlN, with a thickness of 20 nm, was formed on the reproducing layer 1.

Next, a voltage was applied to the GdFeAl target, and, under a gas pressure of $4\times10^{-3}$ Torr, an in-plane magnetized layer 3 made of $(Gd_{0.11}Fe_{0.89})_{0.75}Al_{0.25}$, with a thickness of 30 nm, was formed on the non-magnetic intermediate layer 2. The in-plane magnetized layer 3 formed had a Curie temperature of 120° C., and was magnetized in plane, i.e., in a direction parallel to the surface of the layer, from room temperature up to the Curie temperature.

Next, after again evacuating the interior of the sputtering device to $1\times10^{-6}$ Torr, argon gas was introduced, a voltage was supplied to the GdDyFeCo alloy target, and, under a gas pressure of $4\times10^{-3}$ Torr, a recording layer 4 made of $(Gd_{0.50}Dy_{0.50})_{0.23}(Fe_{0.80}Co_{0.20})_{0.77}$, with a thickness of 40 nm, was formed on the in-plane magnetized layer 3. The recording layer 4 formed had a compensation temperature 25° C., and a Curie temperature of 275° C.

Next, a mixed gas of argon and nitrogen was introduced, a voltage was applied to the Al target, and, under a gas pressure of $4\times10^{-3}$ Torr, a protective layer 8 made of AlN, with a thickness of 20 nm, was formed on the recording layer 4.

Next, by spin-coating a UV-hardened resin onto the protective layer 8 and projecting ultraviolet light thereon, an overcoat layer 9 was formed.

(2) Recording and Reproducing Characteristics

Figure 4:
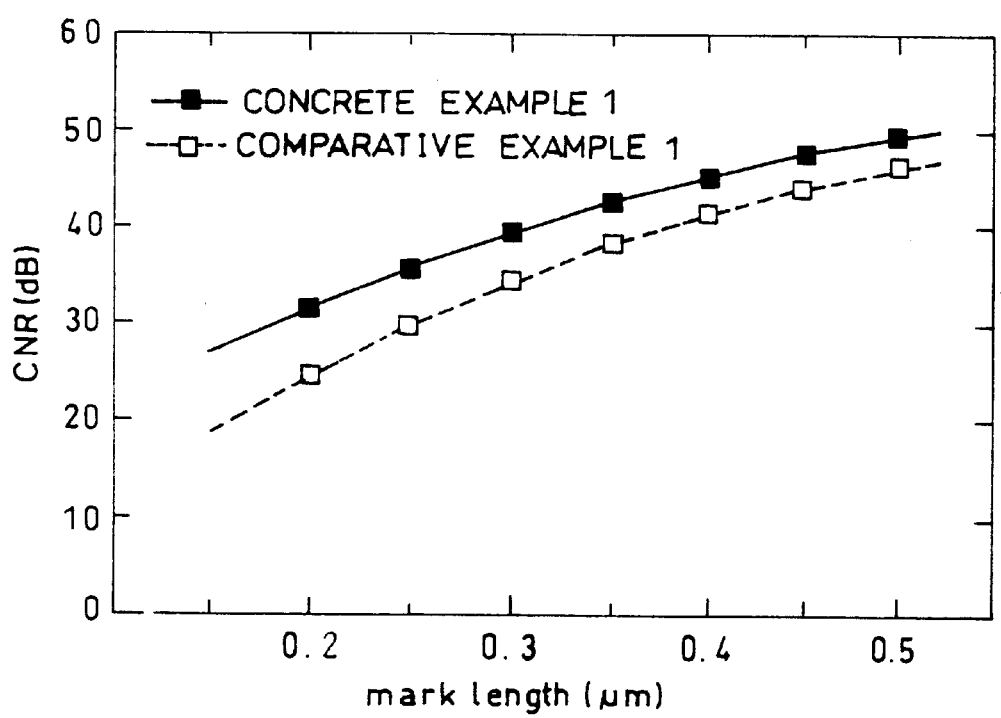
FIG. 4 is a drawing showing recording and reproducing characteristics of a magneto-optical disk according to the first embodiment of the present invention.

The dependence of CNR (carrier-to-noise ratio) on mark length in the foregoing magneto-optical disk was measured by means of a light pickup which used a semiconductor laser of 680 nm wavelength. FIG. 4 shows the results of this measurement. Here, the magneto-optical memory medium according to the present embodiment is shown as Concrete Example 1.

In addition, for comparative purposes, the dependence of CNR on mark length in a magneto-optical disk not provided with an in-plane magnetized layer 3 is also shown in FIG. 4 as Comparative Example 1. The medium of the magneto-optical disk not provided with in-plane magnetized layer had the structure of the present embodiment, but the step for formation of the in-plane magnetized layer 3 was omitted. The dependence of CNR on mark length shown in FIG. 4 is the carrier-to-noise ratio with recording magnetic domains formed with a length corresponding to the mark length and a pitch twice as long as the mark length.

A comparison of the CNR of the two examples at a mark length of 0.3 μm shows that the CNR of Comparative Example 1 was 34.0 dB, and that of Concrete Example 1 was 41.5 dB: an increase of 7.5 dB. This is due to the magnetic masking effect of the in-plane magnetized layer 3 on the recording layer 4, resulting in an improvement in reproducing resolution.

Next, Table 1 shows the results of measurement of the CNR with a mark length of 0.3 μm and various thicknesses of the reproducing layer 1 and the in-plane magnetized layer 3 of Concrete Example 1.

TABLE 1

| REPRODUCING LAYER THICKNESS (nm) | IN-PLANE MAGNETIZED LAYER THICKNESS (nm) | CNR (dB) |
| --- | --- | --- |
| (COMPARATIVE EXAMPLE 1) | | |
| 40 | 0 | 34.0 |
| 40 | 2 | 35.0 |
| 40 | 5 | 37.5 |
| 40 | 10 | 38.5 |
| 40 | 20 | 39.5 |

TABLE 1-continued

| REPRODUCING LAYER THICKNESS (nm) | IN-PLANE MAGNETIZED LAYER THICKNESS (nm) | CNR (dB) |
|---|---|---|
| (CONCRETE EXAMPLE 1) | | |
| 40 | 30 | 41.5 |
| 40 | 40 | 35.5 |
| 40 | 60 | 33.5 |
| 8 | 20 | 32.5 |
| 10 | 20 | 34.5 |
| 20 | 20 | 36.5 |
| 30 | 20 | 38.5 |
| 40 | 20 | 39.5 |
| 60 | 20 | 36.5 |
| 80 | 20 | 34.5 |
| 120 | 20 | 33.5 |

In Table 1, the row with an in-plane magnetized layer thickness of 0 nm shows the results for Comparative Example 1, which was not provided with an in-plane magnetized layer 3. Even with a very thin in-plane magnetized layer 3 of 2 nm, strengthening of in-plane magnetization masking resulted in a 1 dB increase in CNR. Strengthening of in-plane magnetization masking was realized with in-plane magnetized layers 3 of up to 30 nm thick, but with thicknesses greater than 30 nm, CNR decreased. This is believed to be due to the fact that the recording layer 4 and the reproducing layer 1 were too far apart, and to the fact that, in-plane magnetic masking being too strong, it was difficult to open a magnetic aperture, and thus a state of completely perpendicular magnetization of the reproducing layer 1 could not be obtained. From Table 1, it can be seen that a CNR greater than that of Comparative Example 1 was obtained with in-plane magnetized layers 3 having thicknesses ranging from 2 nm to 40 nm, more preferably from 5 nm to 38 nm, and even more preferably from 10 nm to 35 nm.

Again, using a reproducing layer 1 of 8 nm thickness reduced the reproducing signal, resulting in a CNR smaller than that of Comparative Example 1. Further, using a reproducing layer 1 of 120 nm thickness increased magnetic domain wall energy produced in the reproducing layer 1, and completely perpendicular magnetization could not be obtained in the area of increased temperature, resulting in a CNR smaller than that of Comparative Example 1. From Table 1, it can be seen that a CNR greater than that of Comparative Example 1 was obtained with reproducing layers 1 having thicknesses ranging from 10 nm to 80 nm.

Next, Table 2 shows the results of measurement of the CNR and the magnetic field required for erasure (erasure field) with a mark length of 0.3 μm and various thicknesses of non-magnetic intermediate layers 2 of Concrete Example 1.

TABLE 2

| NON-MAGNETIC INTERMEDIATE LAYER THICKNESS (nm) | CNR (dB) | ERASURE FIELD (kA/m) |
|---|---|---|
| 0.5 | 25.0 | 35.5 |
| 1 | 43.5 | 32.4 |
| 4 | 43.0 | 28.8 |
| 10 | 42.0 | 25.4 |
| 20 | 41.5 | 24.6 |
| 30 | 40.5 | 21.4 |
| 40 | 39.5 | 19.3 |
| 60 | 37.0 | 17.2 |

TABLE 2-continued

| NON-MAGNETIC INTERMEDIATE LAYER THICKNESS (nm) | CNR (dB) | ERASURE FIELD (kA/m) |
|---|---|---|
| 80 | 36.5 | 14.6 |
| 100 | 30.0 | 12.4 |

From Table 2, it can be seen that using a non-magnetic intermediate layer 2 of 0.5 nm thickness resulted in a marked decrease in the CNR. This is believed to be due to the fact that a good state of magnetostatic coupling could not be obtained, because the non-magnetic intermediate layer 2 was too thin. Using a non-magnetic intermediate layer 2 of 1 nm thickness resulted in the maximum CNR value, and it can be seen that further increase of the thickness of the non-magnetic intermediate layer 2 resulted in decrease of magnetostatic coupling force and decrease of CNR. It can be seen that, in order to obtain a CNR higher than that of Comparative Example 1, it is necessary to set the thickness of the non-magnetic intermediate layer 2 within a range from 1 nm to 80 nm.

Further, it can be seen that increasing the thickness of the non-magnetic intermediate layer 2 decreased the magnetostatic coupling of the reproducing layer 1 and the recording layer 4, resulting in a reduction in the erasure field. In order to ensure that the erasure field is within a practical range of 31 kA/m or less, it is preferable to use a non-magnetic intermediate layer 2 not less than 4 nm in thickness.

SECOND EMBODIMENT

The present embodiment will explain examples using in-plane magnetized layers 3 differing in composition from that of the concrete examples of the magneto-optical disk discussed in the first embodiment above.

The firs embodiment above discussed recording and reproducing characteristics when using an in-plane magnetized layer 3 made of $(Gd_{0.11}Fe_{0.89})_{0.75}Al_{0.25}$ and having a Curie temperature of 120° C. However, the present second embodiment will discuss the results of investigation of recording and reproducing characteristics using in-plane magnetized layers 3 containing various proportions of Al.

Table 3 shows the Curie temperatures $T_{C2}$ of in-plane magnetized layers 3 made of $(Gd_{0.11}Fe_{0.89})_xAl_{1-x}$ of 30 nm thickness, and the results of measurement of CNR, with a mark length of 0.3 μm, by means of a light pickup which used a semiconductor laser of 680 nm wavelength, for various values of X (atom ratio)

TABLE 3

| X (ATOM RATIO) | $T_{C2}$ (° C.) | CNR (dB) |
|---|---|---|
| 0.25 | 35 | 34.0 |
| 0.30 | 60 | 36.5 |
| 0.50 | 95 | 38.0 |
| 0.75 | 120 | 41.5 |
| 1.00 | 220 | 39.0 |

As Table 3 shows, a CNR greater than that of Comparative Example 1 (34.0 dB), which was not provided with an in-plane magnetized layer 3, can be obtained within the range $0.30 \leq X \leq 1.00$. The reproducing layer 1 of the present second embodiment is the same as that of the first embodiment, and thus becomes perpendicularly magnetized at 120° C. In other words, it is sufficient if the in-plane magnetized layer 3 masks the magnetic field of the recording layer 4 at temperatures below 120° C., and accordingly a suitable Curie temperature for the in-plane magnetized layer 3 is around 120° C. However, as shown in the present second embodiment, a CNR greater than that of Comparative Example 1 was obtained with in-plane magnetized layers 3 with Curie temperatures of not less than 60° C. and not more than 220° C. Thus a magnetic mask can be realized by setting the Curie temperature of the in-plane magnetized layer at not less than 60° C. and not more than 220° C.

Further, the present second embodiment discusses results obtained using in-plane magnetized layers 3 made of GdFeAl, but, as long as it has in-plane magnetization within the foregoing Curie temperature range (60° C.–220° C.), an in-plane magnetized layer 3 made of GdFe, GdFeAl, GdFeTi, GdFeTa, GdFePt, GdFeAu, GdFeCu, GdFeAlTi, GdFeAlTa, NdFe, NdFeAl, DyFe, or DyFeAl may also be used.

THIRD EMBODIMENT

The present embodiment will explain examples using in-plane magnetized layers 3 made of materials differing from those of the concrete examples of the magneto-optical disk discussed in the first embodiment above.

The first embodiment above discussed recording and reproducing characteristics when using an in-plane magnetized layer 3 made of $(Gd_{0.11}Fe_{0.89})_{0.75}Al_{0.25}$ and having a Curie temperature of 120° C. However, the present third embodiment will discuss the results obtained using in-plane magnetized layers 3 containing other metallic elements instead of Al.

Table 4 shows the Curie temperatures $T_{C2}$ of in-plane magnetized layers 3 made of $(Gd_{0.11}Fe_{0.89})_{0.75}Z_{0.25}$ of 20 nm thickness, and the results of measurement of CNR, with a mark length of 0.3 μm, by means of a light pickup which used a semiconductor laser of 680 nm wavelength. Here, the metals used for Z were Ti, Ta, Pt, Au, Cu, $Al_{0.5}Ti_{0.5}$, and $Al_{0.5}Ta_{0.5}$.

TABLE 4

| Z | $T_{C2}$ (° C.) | CNR (dB) |
| --- | --- | --- |
| Ti | 115 | 40.5 |
| Ta | 110 | 40.0 |
| Pt | 125 | 40.5 |
| Au | 120 | 40.0 |
| Cu | 110 | 39.5 |
| $Al_{0.5}Ti_{0.5}$ | 125 | 40.0 |
| $Al_{0.5}Ta_{0.5}$ | 125 | 39.5 |

Table 4 shows that a CNR higher than that of Comparative Example 1 (34.0 dB) was obtained in each of the cases when Ti, Ta, Pt, Au, Cu, $Al_{0.5}Ti_{0.5}$, and $Al_{0.5}Ta_{0.5}$ were used for Z. As mentioned in the second embodiment above, it is sufficient if the in-plane magnetized layer 3 has a Curie temperature within a range from 60° C. to 220° C., and in-plane magnetized layers 3 made of NdFeTi, NdFeTa, DyFeTi, or DyFeTa may also be used.

FOURTH EMBODIMENT

Figure 5:
FIG. 5 is a schematic cross-sectional drawing showing the structure of layers in a magneto-optical disk according to the fourth embodiment of the present invention.

The following will explain a fourth embodiment of the present invention with reference to FIG. 5. The present embodiment will explain a case in which a magneto-optical disk is used as the magneto-optical memory medium. However, explanation of members equivalent to those of the first through third embodiments will be omitted.

As shown in FIG. 5, a magneto-optical disk according to the present fourth embodiment includes a substrate 6, a transparent dielectric layer 7, a reproducing layer 1, a non-magnetic intermediate layer 2, a reflective layer 10, an in-plane magnetized layer 3, a recording layer 4, a protective layer 8, and an overcoat layer 9, layered together in that order to make up a disk main body.

In the first embodiment above, when using in-plane magnetized layers 3 less than 10 nm thick, the light beam 5, passing through the reproducing layer 1 and the non-magnetic intermediate layer 2, was reflected from the recording layer 4, and thus unnecessary information from the recording layer 4 contaminated the reproducing signal.

However, the present fourth embodiment provides a reflective layer 10 between the non-magnetic intermediate layer 2 and the in-plane magnetized layer 3 of the magneto-optical disk described in the first embodiment above. By means of this structure, the light beam 5 which has passed through the reproducing layer 1 is reflected by the reflective layer 10, and thus unnecessary information from the recording layer 4 can be prevented from becoming mixed with the reproducing signal.

The following will explain (1) the method of formation, and (2) the recording and reproducing characteristics of a concrete example of a magneto-optical disk according to the present fourth embodiment.

(1) Method of Formation

In a magneto-optical disk according to the present fourth embodiment, a reflective layer 10 made of Al is provided between the non-magnetic intermediate layer 2 and the in-plane magnetized layer 3 of the first embodiment above, and the substrate 6, transparent dielectric layer 7, reproducing layer 1, non-magnetic intermediate layer 2, in-plane magnetized layer 3, recording layer 4, protective layer 8, and overcoat layer 9 are formed as in the method of formation of the magneto-optical disk according to the first embodiment, except that the reproducing layer 1 is provided with a thickness of 17.5 nm, and the in-plane magnetized layer 3 with a thickness of 7.5 nm.

After formation of non-magnetic intermediate layers 2, the sputtering device was again evacuated to $1\times10^{-6}$ Torr, argon was introduced, a voltage was applied to the Al target, and, under a gas pressure of $4\times10^{-3}$ Torr, reflective layers 10 made of Al, with thicknesses ranging from 2 nm to 80 nm, were formed on the non-magnetic intermediate layers 2.

(2) Recording and Reproducing Characteristics

Table 5 shows the results of measurement of the CNR of magneto-optical disks according to the present fourth embodiment with reflective layers 10 of varying thicknesses, by means of a light pickup which used a semiconductor laser of 680 nm wavelength, and a mark length of 0.3 μm.

In Table 5, the row with a reflective layer thickness of 0 nm shows the results for a magneto-optical disk which was not provided with a reflective layer 10. Even with a very thin reflective layer 10 of 2 nm, prevention of reproducing of information from tne recording layer 4 was obtained, resulting in a 1.0 dB increase in CNR.

TABLE 5

| REFLECTIVE LAYER THICKNESS (nm) | CNR (dB) |
| --- | --- |
| 0 | 35.5 |
| 2 | 36.5 |
| 5 | 38.5 |
| 10 | 41.5 |
| 20 | 42.5 |

TABLE 5-continued

| REFLECTIVE LAYER THICKNESS (nm) | CNR (dB) |
|---|---|
| 30 | 41.0 |
| 40 | 39.0 |
| 50 | 34.5 |

As the reflective layer 10 was made thicker, CNR gradually increased, until it reached its maximum value when the reflective layer 10 was 20 nm thick. This was because with thicker reflective layers, the effect of preventing reproducing of information from the recording layer 4 was more marked. With thicknesses of 30 nm and greater, CNR gradually decreased. This was because of weakening of magnetostatic coupling between the recording layer 4 and the reproducing layer 1 due to increased distance between these two members.

From Table 5, it can be seen that, in order to obtain a CRN greater than that of the magneto-optical disk not provided with a reflective layer 10, it is necessary to set the thickness of the reflective layer 10 within a range from 2 nm to 50 nm.

FIFTH EMBODIMENT

The present embodiment will explain examples using reflective layers 10 made of materials differing from those of the concrete examples of the magneto-optical disk discussed in the fourth embodiment above.

The fourth embodiment above discussed reproducing characteristics when using a reflective layer 10 made of Al. However, in order to improve recording characteristics, the present fifth embodiment will discuss the results obtained using reflective layers made of alloys of Al and metals other than Al.

Using reflective layers 10 made of $Al_{1-x}Fe_x$ of 20 nm thickness, Table 6 shows the results of measurement of CNR, with a mark length of 0.3 μm, by means of a light pickup which used a semiconductor laser of 680 nm wavelength, and of measurement of erasure field, for various values of X (atom ratio).

TABLE 6

| X (ATOM RATIO) | CNR (dB) | ERASURE FIELD (kA/m) |
|---|---|---|
| 0.00 | 42.5 | 50 |
| 0.02 | 42.0 | 17 |
| 0.05 | 42.0 | 16 |
| 0.10 | 42.5 | 17 |
| 0.25 | 42.0 | 18 |
| 0.50 | 40.5 | 30 |
| 0.60 | 39.5 | 58 |

As Table 6 shows, CNR gradually decreased as the quantity of Fe included was increased, i.e., as X increased above 0.10. However, in each case CNR was greater than that of a magneto-optical disk not provided with a reflective layer 10, thus showing the effect of providing the reflective layer 10.

On the other hand, with regard to the erasure field, a reflective layer 10 made of pure Al required a large erasure field of 50 kA/m, but it was possible to reduce the erasure field by setting X at no less than 0.02, but no more than 0.50.

Next, using reflective layers 10 made of $Al_{1-x}Ni_x$ of 20 nm thickness, Table 7 shows the results of measurement of CNR, with a mark length of 0.3 μm, by means of a light pickup which used a semiconductor laser of 680 nm wavelength, and of measurement of erasure field, for various values of X (atom ratio).

TABLE 7

| X (ATOM RATIO) | CNR (dB) | ERASURE FIELD (kA/m) |
|---|---|---|
| 0.00 | 42.5 | 50 |
| 0.02 | 42.5 | 15 |
| 0.05 | 42.0 | 16 |
| 0.10 | 42.0 | 18 |
| 0.25 | 41.5 | 18 |
| 0.50 | 41.0 | 28 |
| 0.60 | 39.0 | 62 |

As Table 7 shows, as in the case of inclusion of Fe, it was possible to reduce the erasure field by setting X at no less than 0.02, but no more than 0.50.

The erasure field can also be reduced by including with the Al a magnetic metal such as Co, Gd, Tb, Dy, Nd, etc. instead of Fe or Ni.

SIXTH EMBODIMENT

The present embodiment will explain examples using reflective layers 10 made of materials differing from those of the concrete examples of the magneto-optical disks discussed in the fourth and fifth embodiments above.

The fifth embodiment above discussed results obtained with reflective layers 10 which included magnetic metallic elements and Al. The present sixth embodiment, however, will discuss improvement of recording characteristics when non-magnetic metallic elements are included with the Al.

Using reflective layers 10 made of $Al_{1-x}Ti_x$ of 20 nm thickness, Table 8 shows the results of measurement of CNR, with a mark length of 0.3 μm, by means of a light pickup which used a semiconductor laser of 680 nm wavelength, and of measurement of erasure field, for various values of X (atom ratio).

TABLE 8

| X (ATOM RATIO) | CNR (dB) | ERASURE FIELD (kA/m) |
|---|---|---|
| 0.00 | 42.5 | 50 |
| 0.02 | 42.5 | 15 |
| 0.05 | 42.0 | 16 |
| 0.10 | 42.0 | 18 |
| 0.25 | 42.5 | 17 |
| 0.50 | 42.0 | 15 |
| 0.75 | 41.5 | 17 |
| 0.90 | 42.0 | 16 |
| 0.95 | 41.5 | 17 |
| 0.98 | 41.0 | 15 |
| 1.00 | 40.0 | 48 |

As Table 8 shows, there was a slight gradual decrease in CNR as the quantity of Ti included was increased, i.e., as X increased above 0.95. However, in each case CNR was greater than that of a magneto-optical disk not provided with a reflective layer 10, thus showing the effect of providing the reflective layer 10.

On the other hand, with regard to the erasure field, reflective layers 10 made of pure Al and pure Ti required large erasure fields of 50 kA/m and 48 kA/m, respectively, but it was possible to reduce the erasure field by setting X at no less than 0.02, but no more than 0.98.

Next, Table 9 shows the erasure field reduction effect of including with the Al non-magnetic elements other than Ti. Using reflective layers 10 made of $Al_{0.5}Z_{0.5}$, Table 9 shows the results of measurement of CNR, with a mark length of 0.3 µm, by means of a light pickup which used a semiconductor laser of 680 nm wavelength, using for Z the non-magnetic metals other than Ti shown in Table 9.

TABLE 9

| Z  | CNR (dB) | ERASURE FIELD (kA/m) |
|----|----------|----------------------|
| Ta | 40.0     | 15                   |
| Pt | 42.0     | 16                   |
| Au | 42.5     | 15                   |
| Cu | 41.5     | 17                   |
| Si | 41.0     | 16                   |

As Table 9 shows, in each of the cases when Ta, Pt, Au, Cu, and Si were used for Z, CNR was greater than that of a magneto-optical disk not provided with a reflective layer 10, thus showing the effect of providing the reflective layer 10. On the other hand, with regard to the erasure field, as in the case of including Ti with the Al, it was possible to reduce the erasure field.

Each of the first through sixth embodiments above used for the reproducing layer 1 a magnetic layer which had in-plane magnetization at room temperature and perpendicular magnetization at a higher temperature such as that reached during reproducing, but any layer which is perpendicularly magnetized at least in the signal reproducing area (the area which is heated to above the predetermined temperature (reproducing temperature) during reproducing).

Further, the first through sixth embodiments above used the in-plane magnetized layer 3, but other layers which may be used instead of this layer include: (1) a magnetic layer which has in-plane magnetization at room temperature and shifts to perpendicular magnetization at a higher temperature (see the eleventh through fifteenth embodiments below); and (2) a perpendicularly magnetized layer in which a transition metal sub-lattice is magnetized in the same direction as the recording layer 4, and the sum of the magnetizations of the transition metal sub-lattice and a rare earth metal sub-lattice has a direction opposite that of the recording layer 4 (see the seventh through tenth embodiments below). In addition, the in-plane magnetized layer 3 of the first through sixth embodiments, or the perpendicularly magnetized layer in (2) above, need not be adjacent to the recording layer 4, but may instead be (3) magnetostatically coupled with the recording layer 4.

SEVENTH EMBODIMENT

Next, a magneto-optical memory medium according to the present embodiment will be explained in detail with reference to the drawings.

Figure 6:
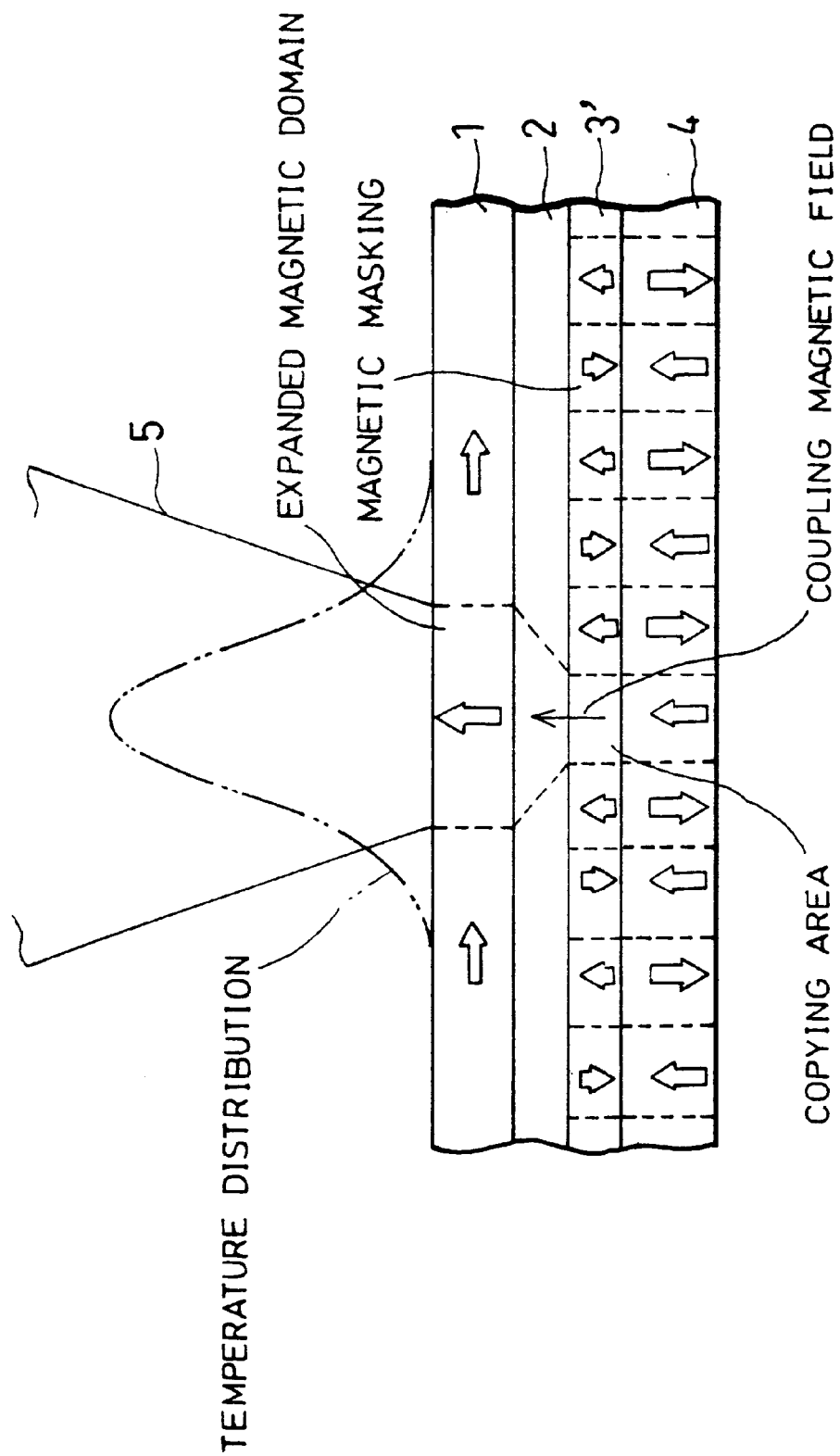
FIG. 6 is a drawing explaining the reproducing principle of magneto-optical disks according to the seventh through tenth embodiments of the present invention.

FIG. 6 shows the operating principle of magnetic domain expansion reproducing according to the present seventh embodiment.

In the present magneto-optical memory device, the magnetic field produced by the recording layer is, in the low-temperature area, cancelled by a magnetic field of opposite direction. For example, in the magneto-optical memory medium shown in FIG. 6, which uses magnetic domain expansion reproducing, an isolating layer 3' (referred to in the claims as the "magnetic masking layer") made of an alloy of rare earth and transition metals is provided adjacent to and exchange coupled with the recording layer 4. With regard to the isolating layer 3', at room temperature, the moment of its rare earth metal sub-lattice is greater than that of its transition metal sub-lattice (it is rare earth metal rich). With regard to the recording layer 4, within a range from room temperature up to the Curie temperature, the moment of its transition metal sub-lattice is greater than that of its rare earth metal sub-lattice (it is transition metal rich).

In the present magneto-optical memory medium, with the foregoing structure, since the recording layer 4 and the isolating layer 3' are exchange coupled, and since the directions of the moments of the transition metal sub-lattices are the same, at room temperature, the direction of the total magnetization of the isolating layer 3' (the direction of the moment of its rare earth metal sub-lattice) is opposite to the direction of the total magnetization of the recording layer 4 (the direction of the moment of its transition metal sub-lattice). In the magneto-optical memory medium according to the present seventh embodiment, the direction of the magnetic field influencing the reproducing layer is determined by the total magnetization of the recording layer 4 and the isolating layer 3'. Accordingly, when using the foregoing isolating layer 3', the magnetic field of the recording layer 4 can be reduced by the magnetic field of the isolating layer 3', at least at room temperature. In short, magnetic coupling of the recording layer 4 and the reproducing layer 1 can be prevented.

Further, it is preferable if, in the low-temperature area around room temperature, the total magnetization of the isolating layer 3' and the total magnetization of the recording layer 4 are substantially equal, and thus balanced, since by this means the magnetic flux leaking to the reproducing layer 1 can be reduced to nearly zero.

In contrast, when the temperature rises from room temperature, in the isolating layer 3', the difference between the moments of the rare earth and transition metal sub-lattices decreases, thus decreasing the total magnetization of the isolating layer 3', while in the recording layer 4, the difference between the moments of the rare earth and transition metal sub-lattices temporarily increases, thus increasing the total magnetization of the recording layer 4. Accordingly, due to heat applied during reproducing, the balance of the total magnetization of the recording layer 4 and the isolating layer 3' is upset, and the reproducing layer 1 comes to be influenced by the magnetic field produced by the recording layer 4. By this means, the magnetization of the recording layer 4 is copied to the reproducing layer 1.

As discussed above, in the magneto-optical memory medium according to the present seventh embodiment, during reproducing, the magnetic field of the recording layer 4 is masked by the isolating layer 3' in the low-temperature area, and it is only in the high-temperature area (the center of the light beam spot) that the magnetic flux of the recording layer 4 leaks through, and the recording signal is copied to the reproducing layer 1. As a result, even when the interval between recording bits is small, and adjacent recording bits fall below the expanded magnetic domain of the reproducing layer 1, the magnetic fields of these adjacent bits do not reach the reproducing layer 1, due to the isolating layer 3'. Thus, the direction of magnetization of the reproducing layer 1 is determined only by the recording bit in the area heated to high temperature at the center of the light beam, and good reproducing characteristics can be obtained.

In addition, when reproducing information from the present magneto-optical memory medium, smoother reproducing operations can be obtained by successively forming, reproducing, and erasing the magnetic domains of the reproducing layer 1. For this reason, if the light beam 5 (the reproducing laser beam) emits pulses, it is possible to erase the magnetic domain when the laser is off, and, when the laser emits light, to raise the temperature of the medium, copy the magnetic domain of the recording layer 4 to the reproducing layer 1, and reproduce the signal. Thus the quality of signal reproducing can be increased.

Next, concrete examples according to the present seventh embodiment will be explained with reference to FIG. 7. The following explains cases in which the magneto-optical memory medium is embodied as a magneto-optical disk.

Figure 7:
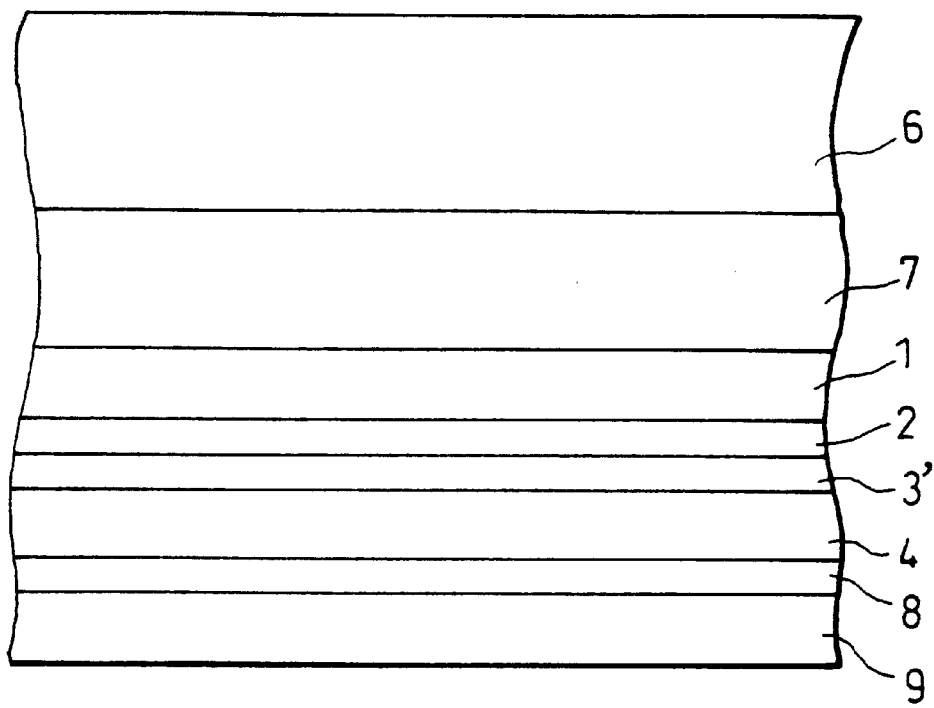
FIG. 7 is a schematic cross-sectional drawing showing the structure of layers in a magneto-optical disk according to the seventh embodiment of the present invention.

As shown in FIG. 7, a magneto-optical disk according to the present seventh embodiment includes a substrate 6, a transparent dielectric layer 7, a reproducing layer 1, a non-magnetic intermediate layer 2, an isolating layer 3', a recording layer 4, a protective layer 8, and an overcoat layer 9, layered together in that order to make up a disk main body.

In a magneto-optical disk of this type, the recording method used is the Curie temperature recording method. An objective lens is used to focus onto the reproducing layer 1 a light beam 5 emitted by a semiconductor laser, and recording and reproducing are carried out by means of the magneto-optical effect known as polar Kerr effect, which was discussed above.

The substrate 6 is made of a transparent material such as polycarbonate formed into a disk shape.

The transparent dielectric layer 7 is preferably made of a material which does not contain oxygen, such as AlN, SiN, AlSiN, etc. The thickness of the transparent dielectric layer 7 must be set so as to realize a suitable interference effect with respect to the light beam 5, and so as to increase the Kerr revolution angle of the medium. Accordingly, the thickness of the transparent dielectric layer 7 is set to around ($\lambda/4n$), where $\lambda$ is the wavelength of the light beam 5 (reproducing light), and n is the refractive index of the transparent dielectric layer 7. For example, if the wavelength of the light beam 5 (which is laser light) is 680 nm, the thickness of the transparent dielectric layer 7 may be set to around 30 nm to 100 nm.

The reproducing layer 1 is a magnetic film chiefly composed of an alloy of rare earth and transition metals, or of rare earth metals, or of transition metals, and its composition is adjusted so that it has magnetic characteristics whereby its coercive force is reduced at temperatures around the reproducing temperature.

The non-magnetic intermediate layer 2 is made of a dielectric material such as AlN, SiN, or AlSiN, or of an alloy of non-magnetic metals such as Al, Ti, or Ta. The thickness of the non-magnetic intermediate layer 2 is set to 1 nm to 80 nm, so that the reproducing layer 1 will be magnetostatically coupled with the isolating layer 3' and the recording layer 4.

The composition of the isolating layer 3' is adjusted so that, at room temperature, the moment of the rare earth metal sub-lattice is greater than that of the transition metal sub-lattice, so that the magnetic field produced by the recording field is masked at room temperature. Further, within a range from room temperature up to the Curie temperature, the direction of the moment of the transition metal sub-lattice of the isolating layer 3' always accords with the direction of the moment of the transition metal sub-lattice of the recording layer 4 to be discussed below. In other words, the composition of the isolating layer 3' is adjusted so that the direction of the moment of its transition metal sub-lattice is determined by the direction of the moment of the transition metal sub-lattice of the recording layer 4.

The recording layer 4 is a perpendicularly magnetized film made of an alloy of rare earth and transition metals. Within a range from room temperature up to the Curie temperature, the moment of its transition metal sub-lattice is greater than that of its rare earth metal sub-lattice. The thickness of the recording layer 4 is set within a range from 20 nm to 80 nm. Further, the area of the recording magnetic domains is set to be smaller than the area of the magnetic domains formed in the reproducing layer 1 during reproducing.

The protective layer 8 is made of a dielectric material such as AlN, SiN, or AlSiN, or of an alloy of non-magnetic metals such as Al, Ti, Ta, etc. The protective layer 8 serves to prevent oxidation of the rare earth-transition metal alloys used in the reproducing layer 1, recording layer 4, etc., and its thickness is set to within a range from 5 nm to 60 nm.

The overcoat layer 9 is made of a UV-hardened resin or heat-hardened resin coated onto the remainder of the disk main body by spin coating, and then hardened by applying ultraviolet light or heat.

The following will explain the (1) method of formation, and (2) recording and reproducing characteristics of a concrete example according to the present seventh embodiment.

(1) Method of Formation

First, a pre-grooved and pre-pitted substrate 6 made of disk-shaped polycarbonate was placed in a substrate holder in a sputtering device supplied with an Al target, a GdFeCo alloy target, a GdDyFe alloy target, and a GdDyFeCo alloy target. After evacuating the interior of the sputtering device to $1\times10^{-6}$ Torr, a mixed gas of argon and nitrogen was introduced, a voltage was supplied to the Al target, and, under a gas pressure of $4\times10^{-3}$ Torr, a transparent dielectric layer 7 made of AlN, with a thickness of 80 nm, was formed on the substrate 6.

Next, after again evacuating the interior of the sputtering device to $1\times10^{-6}$ Torr, argon gas was introduced, a voltage was supplied to the GdFeCo alloy target, and, under a gas pressure of $4\times10^{-3}$ Torr, a reproducing layer 1 made of $Gd_{0.30}(Fe_{0.80}Co_{0.20})_{0.70}$, with a thickness of 20 nm, was formed on the transparent dielectric layer 7. The reproducing layer 1 produced had characteristics whereby it was magnetized in-plane at room temperature, and was perpendicularly magnetized at 120° C. The reproducing layer 1 had a compensation temperature of 300° C., and a Curie temperature of 320° C.

Next, a mixed gas of argon and nitrogen was introduced, a voltage was applied to the Al target, and, under a gas pressure of $4\times10^{-3}$ Torr, a non-magnetic intermediate layer 2 made of AlN, with a thickness of 20 nm, was formed on the reproducing layer 1.

Next, a voltage was applied to the GdDyFe target, and, under a gas pressure of $4\times10^{-3}$ Torr, an isolating layer 3' made of $(Gd_{0.50}Dy_{0.50})_{0.28}Fe_{0.72}$, with a thickness of 30 nm, was formed on the non-magnetic intermediate layer 2. The isolating layer 3' had a Curie temperature of 140° C., and was a perpendicularly magnetized film which was rare earth metal rich within a range from room temperature up to the Curie temperature.

Next, a voltage was supplied to the GdDyFeCo alloy target, and, under a gas pressure of $4\times10^{-3}$ Torr, a recording layer 4 made of $(Gd_{0.50}Dy_{0.50})_{0.23}(Fe_{0.80}Co_{0.20})_{0.77}$, with a thickness of 40 nm, was formed on isolating layer 3'. The recording layer 4 had a Curie temperature of 275° C.

Next, a mixed gas of argon and nitrogen was introduced, a voltage was applied to the Al target, and, under a gas pressure of $4\times10^{-3}$ Torr, a protective layer 8 made of AlN, with a thickness of 20 nm, was formed on the recording layer 4.

Next, by spin-coating a UV-hardened resin onto the protective layer 8 and projecting ultraviolet light thereon, an overcoat layer 9 was formed.

(2) Recording and Reproducing Characteristics

Figure 8:
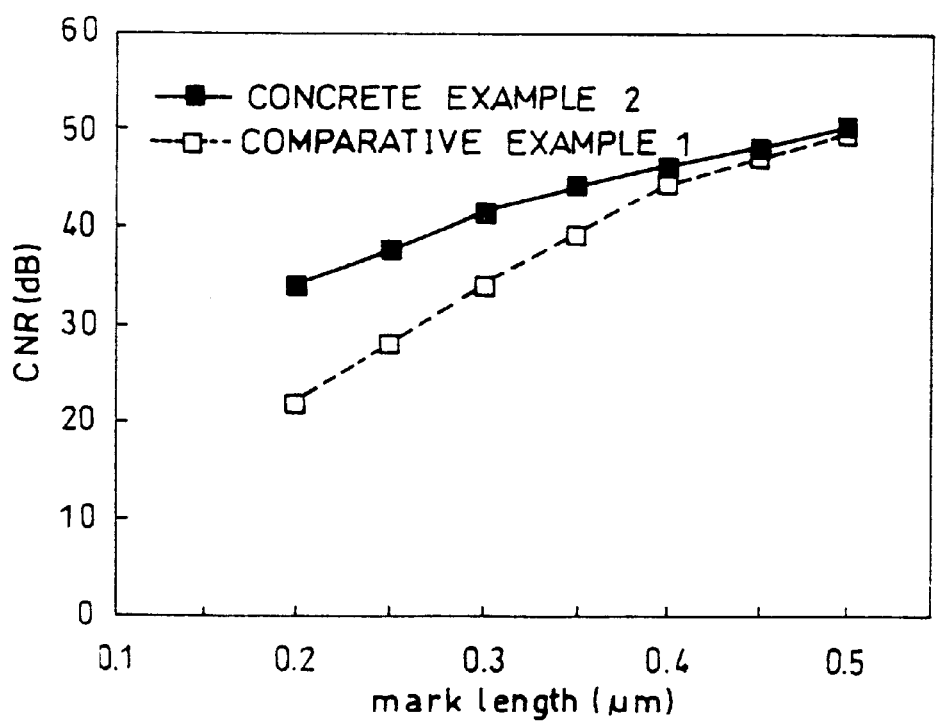
FIG. 8 is a drawing showing recording and reproducing characteristics of a magneto-optical disk according to the seventh embodiment of the present invention.

The dependence of CNR on mark length in the foregoing disk was measured by means of a light pickup which used a semiconductor laser of 680 nm wavelength. FIG. 8 shows the results of this measurement. In FIG. 8, the results for the magneto-optical disk according to the present seventh embodiment are shown as Concrete Example 2.

In addition, for comparative purposes, the dependence of CNR on mark length in a comparative magneto-optical disk not provided with an isolation layer 3' is also shown in FIG. 8 as Comparative Example 1. The medium of the magneto-optical disk not provided with an isolating layer had the structure of the present seventh embodiment, but the step for formation of the isolating layer 3' was omitted. The dependence of CNR on mark length shown in FIG. 8 is the carrier-to-noise ratio with recording magnetic domains with a length corresponding to the mark length formed at a pitch twice as long as the mark length.

A comparison of the CNR of the two examples at a mark length of 0.3 μm shows that the CNR of Comparative Example 1 was 34.0 dB, and that of Concrete Example 2 was 41.5 dB: an increase of 7.5 dB. This is due to masking of adjacent recording bits by the isolating layer 3', resulting in an improvement in reproducing resolution. The following will discuss recording and reproducing characteristics when the conditions for each layer of the present second embodiment were changed.

(a) Thicknesses of Reproducing Layer 1 and Isolating Layer 3'

Next, Table 10 shows the results of measurement of CNR, with a mark length of 0.3 μm, when the thicknesses of the reproducing layer 1 and the isolating layer 3' of Concrete Example 2 were changed.

(TABLE 10)

| REPRODUCING LAYER THICKNESS (nm) | ISOLATING LAYER THICKNESS (nm) | CNR (dB) |
|---|---|---|
| (COMPARATIVE EXAMPLE 1) | | |
| 40 | 0 | 34.0 |
| 40 | 5 | 34.0 |
| 40 | 10 | 35.5 |
| 40 | 20 | 39.5 |
| (CONCRETE EXAMPLE 2) | | |
| 40 | 30 | 41.5 |
| 40 | 40 | 39.5 |
| 40 | 60 | 35.5 |
| 40 | 80 | 32.5 |
| 8 | 30 | 32.5 |
| 10 | 30 | 35.5 |
| 20 | 30 | 37.5 |
| 30 | 30 | 39.5 |
| (CONCRETE EXAMPLE 2) | | |
| 40 | 30 | 41.5 |
| 60 | 30 | 39.5 |
| 80 | 30 | 35.5 |
| 100 | 30 | 33.5 |

In Table 10, the row with an isolating layer thickness of 0 nm shows the results obtained with Comparative Example 1, which was not provided with an isolating layer 3'. Masking effect was evident with isolating layer 3' 10 nm or more in thickness, and CNR was increased but CNR decreased again with thicknesses of 60 nm or more. It is believed this was due to decrease of magnetic field leakage at the high-temperature area, which impedes copying of the magnetic domain from the recording layer 4. From the above, it can be seen that a CNR higher than that of Comparative Example 1 can be obtained with isolating layers 3' with thicknesses ranging from 10 nm to 60 nm, preferably from 15 nm to 50 nm, and more preferably from 20 nm to 40 nm.

Again, with a reproducing layer 1 of 8 nm thickness, the reproducing signal was decreased, resulting in a CNR lower than that of Comparative Example 1. Further, with a reproducing layer 1 of 100 nm thickness, expansion and copying of the magnetic field became difficult, resulting in a CNR lower than that of Comparative Example 1. From the above, it can be seen that a CNR higher than that of Comparative Example 1 can be obtained with reproducing layers 1 with thicknesses within a range from 10 nm to 80 nm.

(b) Thickness of Non-magnetic Intermediate Layer

Next, Table 11 shows the results of measurement of CNR, with a mark length of 0.3 μm, and of measurement of the magnetic field necessary for erasure (erasure field) when the thickness of the non-magnetic intermediate layer 2 of Concrete Example 2 was changed.

TABLE 11

| NON-MAGNETIC INTERMEDIATE LAYER THICKNESS (nm) | CNR (dB) | ERASURE FIELD (kA/m) |
|---|---|---|
| 0.5 | 25.0 | 35.5 |
| 1 | 43.5 | 32.4 |
| 4 | 43.0 | 28.8 |
| 10 (CONCRETE EXAMPLE 2) | 42.0 | 25.4 |
| 20 | 41.5 | 24.6 |
| 30 | 39.5 | 21.4 |
| 40 | 39.0 | 19.3 |
| 60 | 37.5 | 17.2 |
| 80 | 36.5 | 14.6 |
| 100 | 29.5 | 12.4 |

As Table 11 shows, CNR markedly decreased with a non-magnetic intermediate layer 2 of 0.5 nm thickness. This is believe to be due to inability to obtain a good state of magnetostatic coupling, because the non-magnetic intermediate layer 2 was too thin. It can be seen that a non-magnetic intermediate layer 2 of 1 nm thickness yielded the maximum CNR value, and that as its thickness was further increased, CNR decreased. From the above, it can be seen that in order to obtain a CNR higher than that of Comparative Example 1, the thickness of the non-magnetic intermediate layer 2 must be set within a range from 1 nm through 80 nm.

Further, it can also be seen that increasing the thickness of the non-magnetic intermediate layer 2 decreases the magnetostatic coupling of the reproducing layer 1 and the recording layer 4, thus decreasing the erasure field. In order to ensure that the erasure field is within a practical range of 31 kA/m or less, it is preferable to use a non-magnetic intermediate layer 2 which is no less than 4 nm thick.

(c) Curie Temperature of Isolating Layer 3'

The foregoing showed results obtained when using an isolating layer 3' made of $(Gd_{0.50}Dy_{0.50})_{0.28}Fe_{0.72}$, with a Curie temperature of 140° C. The following will explain the results of investigation of recording and reproducing characteristics using isolating layers 3' containing varying proportions of Gd.

Table 12 shows the Curie temperatures $T_{C3}$ of isolating layers 3' made of $(Gd_xDy_{1-x})_{0.28}Fe_{0.72}$ of 30 nm thickness, and the results of measurement of CNR, with a mark length of 0.3 μm, by means of a light pickup which used a semiconductor laser of 680 nm wavelength, for various values of X (atom ratio).

TABLE 12

| X (ATOM RATIO) | $T_{C3}$ (° C.) | CNR (dB) |
|---|---|---|
| 0.00 | 60 | 34.0 |
| 0.20 | 80 | 38.5 |
| 0.35 | 110 | 40.5 |
| (CONCRETE EXAMPLE 2) | | |
| 0.50 | 140 | 41.5 |
| 0.65 | 170 | 41.0 |
| 0.80 | 200 | 40.5 |
| 1.00 | 220 | 38.5 |

As Table 12 shows, a CNR greater than that of Comparative Example 1 (34.0 dB), which was not provided with an isolating layer 3', was obtained within the range $0.20 \leq X \leq 1.00$.

The recording layer 4 used in making the measurements shown in Table 12 had maximum magnetization at a temperature of 140° C. (the temperature of heating during reproducing). Accordingly, it is sufficient if the isolating layer 3' is able to mask magnetic field leakage from the recording layer 4 at temperatures below 140° C., and thus the most suitable Curie temperature for the isolating layer 3' is one substantially equal to that of the recording layer 4, or around 140° C. However, as shown in Table 12, a CNR higher than that of Comparative Example 1 was obtained with isolating layers 3' having Curie temperatures of not less than 80° C. and not more than 220° C. Thus masking effect can be obtained at low temperatures by setting the Curie temperature of the isolating layer 3' at no less than 80° C. and no more than 220° C.

Again, the foregoing explains the results obtained with isolating layers 3' made of GdDyFe, but as long as the above-mentioned Curie temperature range (80° C. to 220° C.) is satisfied, the isolating layer 3' may be made of a perpendicularly magnetized film made of an alloy containing any of: TbFe alloy, DyFe alloy, GdFe alloy, GdTbFe alloy, DyFeCo alloy, and TbFeCo alloy.

(d) Compensation Temperature of Isolating Layer 3'

Further, the foregoing explained that it is preferable to use an isolating layer 3' with a Curie temperature from 80° C. to 220° C., but even if the compensation temperature is from 80° C. to 220° C., the effects of the present seventh embodiment (masking of the magnetic field from the recording layer 4 at room temperature) can be obtained. The following will explain this kind of example.

Using an isolating layer 3' made of $(Gd_{0.80}Dy_{0.20})_{0.26}Fe_{0.74}$ of 30 nm thickness, CNR was measured, with a mark length of 0.3 μm, by means of a light pickup which used a semiconductor laser of 680 nm wavelength. An isolating layer 3' with this composition had a compensation temperature of 140° C., and a Curie temperature of 200° C.

In this case, the CNR measured was 41.5 dB, and characteristics substantially equal to those of Concrete Example 2 were obtained. In other words, the effect of masking the magnetic field of the recording layer 4 can also be obtained when the isolating layer 3' has a compensation temperature. It is preferable to set the compensation temperature at 140° C. (around the temperature of heating during reproducing), at which temperature the recording layer 4 has maximum magnetization, but masking effect can be obtained as long as the compensation temperature is within a range from 80° C. to 220° C. Incidentally, as long as the compensation temperature is within the range from 80° C. to 220° C., the isolating layer 3' may be made of a perpendicularly magnetized film made of an alloy containing any of: GdDyFe alloy, TbFe alloy, DyFe alloy, GdFe alloy, GdTbFe alloy, DyFeCo alloy, and TbFeCo alloy.

EIGHTH EMBODIMENT

Figure 9:
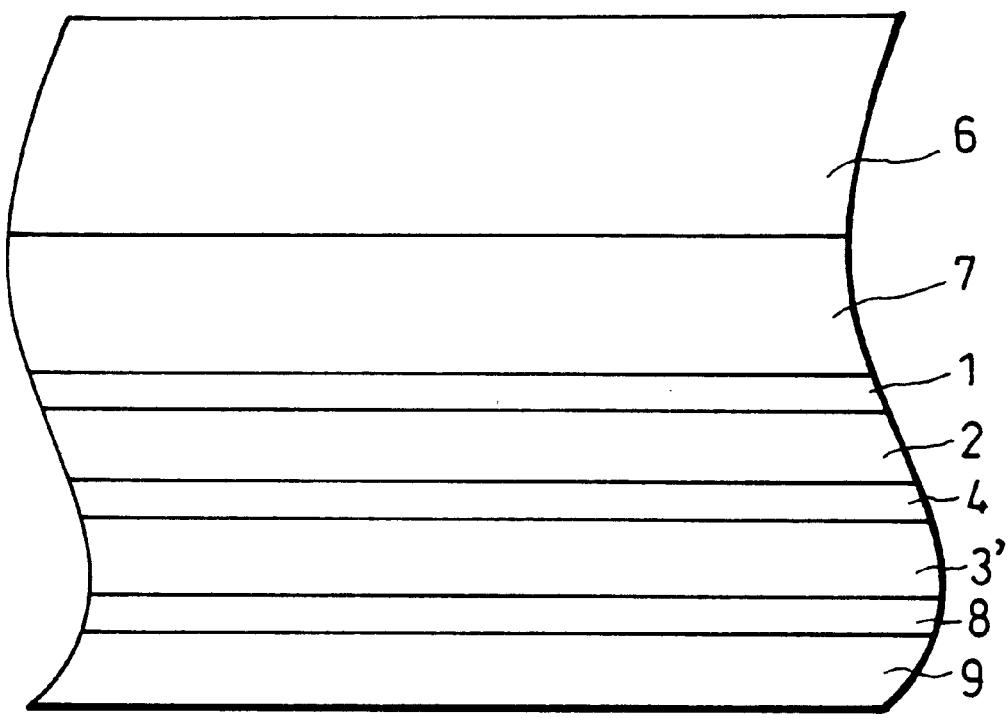
FIG. 9 is a schematic cross-sectional drawing showing the structure of layers in a magneto-optical disk according to the eighth embodiment of the present invention.

The following will explain the eighth embodiment of the present invention with reference to FIG. 9. The present embodiment will explain a case in which the magneto-optical memory medium is embodied as a magneto-optical disk.

As shown in FIG. 9, a magneto-optical disk according to the present eighth embodiment includes a substrate 6, a transparent dielectric layer 7, a reproducing layer 1, a non-magnetic intermediate layer 2, a recording layer 4, an isolating layer 3', a protective layer 8, and an overcoat layer 9, layered together in that order to make up a disk main body.

The magneto-optical disk according to the present eighth embodiment has a structure in which the order of formation of the isolating layer 3' and the recording layer 4 of the magneto-optical disk according to the seventh embodiment above are reversed.

The following will explain the (1) method of formation, and (2) recording and reproducing character-istics of a concrete example according to the present eighth embodiment.

(1) Method of Formation

Using the method of forming a magneto-optical disk discussed in the seventh embodiment above, the magneto-optical disk according to the present eighth embodiment was formed by reversing the order of formation of the isolating layer 3' and the recording layer 4. The substrate 6, transparent dielectric layer 7, reproducing layer 1, non-magnetic intermediate layer 2, protective layer 8, and overcoat layer 9 were formed as in the second embodiment above.

(2) Recording and Reproducing Characteristics

Table 13 shows the results of measurement of CNR, with a mark length of 0.3 μm, by means of a light pickup which used a semiconductor laser of 680 nm wavelength, for various thicknesses of the reproducing layer 1 and the isolating layer 3'.

TABLE 13

| REPRODUCING LAYER THICKNESS (nm) | ISOLATING LAYER THICKNESS (nm) | CNR (dB) |
|---|---|---|
| (COMPARATIVE EXAMPLE 1) | | |
| 40 | 0 | 34.0 |
| 40 | 5 | 34.0 |
| 40 | 10 | 35.5 |
| 40 | 20 | 38.5 |
| (CONCRETE EXAMPLE 3) | | |
| 40 | 30 | 40.5 |
| 40 | 40 | 39.5 |
| 40 | 60 | 37.5 |
| 40 | 80 | 35.5 |
| 40 | 100 | 32.5 |
| 8 | 30 | 32.5 |
| 10 | 30 | 35.5 |
| 20 | 30 | 37.5 |
| 30 | 30 | 38.5 |
| (CONCRETE EXAMPLE 3) | | |
| 40 | 30 | 40.5 |
| 60 | 30 | 38.5 |
| 80 | 30 | 35.5 |
| 100 | 30 | 33.5 |

In Table 13, the row with an isolating layer thickness of 0 nm shows the results obtained with Comparative Example 1, which was not provided with an isolating layer 3'. In addition, the results obtained by merely reversing the order of the recording layer 4 and the isolating layer 3' of Concrete Example 2 discussed in the seventh embodiment above are shown in Table 13 as Concrete Example 3.

Masking effect was obtained with isolating layers 3' with thicknesses of 10 nm or more, resulting in increased CNR, but with thicknesses of 100 nm or more, CNR was reduced. This is believed to be due to the influence of adjacent recording signals because of reduced masking effect. From the above, it can be seen that a CNR higher than that of Comparative Example 1 can be obtained with isolating layers 3' having thicknesses ranging from 10 nm through 80 nm.

In this way, the isolating layer 3' is a perpendicularly magnetized film which is exchange coupled to the recording layer 4, and the total magnetic moment of the recording layer 4 and the isolating layer 3' can be set so that it is 0 at room temperature. As a result, the magnetic field produced by the recording layer 4 can be magnetically masked by cancelling it with the isolating layer 3'. The relative positions of the recording layer 4 and the isolating layer 3' do not influence the respective magnetic fields produced by these layers, and thus it does not matter on which side of the recording layer 4 the isolating layer 3' is located.

In comparison with the seventh embodiment above, since the isolating layer 3' is provided on the side of the recording layer 4 opposite the side from which the light beam 5 is projected, masking effect was weaker, and CNR relatively lower, in the present eighth embodiment, but there was a wider range of thicknesses of the isolating layer 3' able to obtain a CNR higher than that of Comparative Example 1.

With regard to (a) thickness of the reproducing layer 1; (b) thickness of the non-magnetic intermediate layer 2; (c) Curie temperature of the isolating layer 3'; and (d) compensation temperature of the isolating layer 3', the results obtained in the present eighth embodiment were equivalent to those of the seventh embodiment above.

NINTH EMBODIMENT

Figure 10:
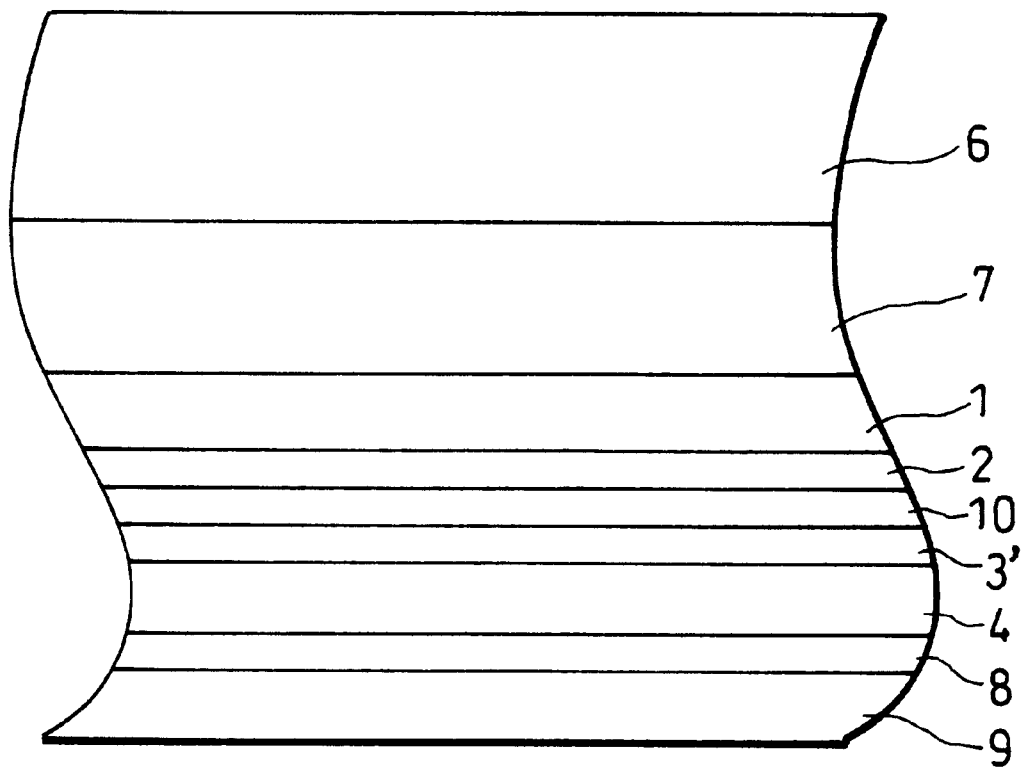
FIG. 10 is a schematic cross-sectional drawing showing the structure of layers in a magneto-optical disk according to the ninth embodiment of the present invention.

The following will explain the ninth embodiment of the present invention with reference to FIG. 10. The present embodiment will explain a case in which the magneto-optical memory medium is embodied as a magneto-optical disk.

As shown in FIG. 10, a magneto-optical disk according to the present ninth embodiment includes a substrate 6, a transparent dielectric layer 7, a reproducing layer 1, a non-magnetic intermediate layer 2, a reflective layer 10, an isolating layer 3', a recording layer 4, a protective layer 8, and an overcoat layer 9, layered together in that order to make up a disk main body.

In the seventh and eighth embodiments above, when using reproducing layers 1 less than 40 nm thick, the light beam 5, passing through the reproducing layer 1, was reflected from the isolating layer 3' or the recording layer 4, and thus information from adjacent recording bits of the recording layer 4 became mixed with the reproducing signal. This resulted in impairment of reproducing signal characteristics.

However, the present ninth embodiment provides a reflective layer 10 between the non-magnetic intermediate layer 2 and the isolating layer 3' of the magneto-optical disk described in the seventh embodiment above. By means of this structure, even when using a thin reproducing layer 1 of less than 40 nm, the light beam 5 which has passed through the reproducing layer 1 is reflected by the reflective layer 10, and thus unnecessary information from adjacent recording bits of the recording layer 4 can be prevented from becoming mixed with the reproducing signal. Thus magnetic domain expansion reproducing by means of the reproducing layer 1 can be improved.

The following will explain (1) the method of formation, and (2) the recording and reproducing characteristics of a concrete example of a magneto-optical disk according to the present ninth embodiment.

(1) Method of Formation

In a magneto-optical disk according to the present ninth embodiment, a reflective layer 10 made of Al is provided between the non-magnetic intermediate layer 2 and the isolating layer 3' of the seventh embodiment above, and the substrate 6, transparent dielectric layer 7, reproducing layer 1, non-magnetic intermediate layer 2, isolating layer 3', recording layer 4, protective layer 8, and overcoat layer 9 are formed as with Concrete Example 2. The reproducing layer 1 was provided with a thickness of 25 nm.

After formation of non-magnetic intermediate layers 2, the sputtering device was again evacuated to $1 \times 10^{-6}$ Torr, argon was introduced, a voltage was applied to the Al target, and, under a gas pressure of $4 \times 10^{-3}$ Torr, reflective layers 10 made of Al, with thicknesses ranging from 2 nm to 80 nm, were formed on the non-magnetic intermediate layers 2.

(2) Recording and Reproducing Characteristics

Table 14 shows the results of measurement of the CNR of magneto-optical disks according to the present ninth embodiment with reflective layers 10 of varying thicknesses, by means of a light pickup which used a semiconductor laser of 680 nm wavelength, and a mark length of 0.3 μm.

TABLE 14

| REFLECTIVE LAYER THICKNESS (nm) | CNR (dB) |
| --- | --- |
| 0 | 38.5 |
| 2 | 39.0 |
| 5 | 40.5 |
| 10 | 41.0 |
| 20 | 42.5 |
| 30 | 41.0 |
| 40 | 39.0 |
| 50 | 36.5 |

In table 14 the row with a reflective layer thickness of 0 nm shows the results for a magneto-optical disk which was not provided with a reflective layer 10. Even with a very thin reflective layer 10 of 2 nm, prevention of reproducing of information from the recording layer 4 was obtained, resulting in a 0.5 dB increase in CNR. As the reflective layer 10 was made thicker, CNR gradually increased, until it reached its maximum value when the reflective layer 10 was 20 nm thick. This was because with thicker reflective layers, the effect of preventing reproducing of information from the recording layer 4 was more marked.

With thicknesses of 20 nm and greater, CNR was decreased. This was because of weakening of magnetostatic coupling between the recording layer 4 and the reproducing layer 1 due to increased distance between these two members.

From the above, it can be seen that, in order to obtain a CNR greater than that of the magneto-optical disk not provided with a reflective layer 10, it is necessary to set the thickness of the reflective layer 10 within a range from 2 nm to 40 nm.

The foregoing discussed reproducing characteristics when using a reflective layer 10 made of Al, but reflective layers made of alloys of Al and metals other than Al may also be used.

Using reflective layers 10 made of $Al_{1-x}Fe_x$ of 20 nm thickness, Table 15 shows the results of measurement of CNR, with a mark length of 0.3 µm, by means of a light pickup which used a semiconductor laser of 680 nm wavelength, and of measurement of erasure field, for various values of X (atom ratio)

TABLE 15

| X (ATOM RATIO) | CNR (dB) | ERASURE FIELD (kA/m) |
|---|---|---|
| 0.00 | 42.5 | 50 |
| 0.02 | 42.5 | 17 |
| 0.05 | 42.5 | 16 |
| 0.10 | 42.5 | 17 |
| 0.25 | 42.0 | 18 |
| 0.50 | 41.5 | 30 |
| 0.60 | 40.5 | 58 |

As Table 15 shows, CNR gradually decreased as the quantity of Fe included was increased, i.e., as X increased above 0.10. However, in each case CNR was greater than that of a magneto-optical disk not provided with a reflective layer 10, thus showing the effect of providing the reflective layer 10. On the other hand, with regard to the erasure field, a reflective layer 10 made of pure Al required a large erasure field of 50 kA/m, but it was possible to reduce the erasure field by setting X at no less than 0.02, but no more than 0.50.

Next, using reflective layers 10 made of $Al_{1-x}Ni_x$ of 20 nm thickness, Table 16 shows the results of measurement of CNR, with a mark length of 0.3 µm, by means of a light pickup which used a semiconductor laser of 680 nm wavelength, and of measurement of erasure field, for various values of X (atom ratio).

TABLE 16

| X (ATOM RATIO) | CNR (dB) | ERASURE FIELD (kA/m) |
|---|---|---|
| 0.00 | 42.5 | 50 |
| 0.02 | 42.5 | 15 |
| 0.05 | 42.0 | 16 |
| 0.10 | 42.0 | 18 |
| 0.25 | 41.5 | 18 |
| 0.50 | 41.0 | 28 |
| 0.60 | 40.0 | 62 |

As Table 16 shows, as in the case of inclusion of Fe, it was possible to reduce the erasure field by setting X at no less than 0.02, but no more than 0.50.

The erasure field can also be reduced by including with the Al a magnetic metal such as Co, Gd, Tb, Dy, Nd, etc. instead of Fe or Ni.

The following will discuss improvement of recording characteristics when non-magnetic metallic elements are included with the Al.

Using reflective layers 10 made of $Al_{1-x}Ti_x$ of 20 nm thickness, Table 17 shows the results of measurement of CNR, with a mark length of 0.3 µm, by means of a light pickup which used a semiconductor laser of 680 nm wavelength, and of measurement of erasure field, for various values of X (atom ratio).

TABLE 17

| X (ATOM RATIO) | CNR (dB) | ERASURE FIELD (kA/m) |
|---|---|---|
| 0.00 | 42.5 | 50 |
| 0.02 | 42.5 | 15 |
| 0.05 | 42.0 | 16 |

TABLE 17-continued

| X (ATOM RATIO) | CNR (dB) | ERASURE FIELD (kA/m) |
|---|---|---|
| 0.10 | 42.0 | 18 |
| 0.25 | 42.5 | 17 |
| 0.50 | 42.0 | 15 |
| 0.75 | 41.5 | 17 |
| 0.90 | 42.0 | 16 |
| 0.95 | 41.5 | 17 |
| 0.98 | 41.0 | 15 |
| 1.00 | 40.0 | 48 |

As Table 17 shows, there was a slight gradual decrease in CNR as the quantity of Ti included was increased, i.e., as X increased above 0.95. However, in each case CNR was greater than that of a magneto-optical disk not provided with a reflective layer 10, thus showing the effect of providing the reflective layer 10. On the other hand, with regard to the erasure field, reflective layers 10 made of pure Al and pure Ti required large erasure fields of 50 kA/m and 48 kA/m, respectively, but it was possible to reduce the erasure field by setting X at no less than 0.02, but no more than 0.98.

Next, Table 18 shows the erasure field reduction effect of including with the Al non-magnetic elements other than Ti. Using reflective layers 10 made of $Al_{0.5}Z_{0.5}$, Table 18 shows the results of measurement of CNR, with a mark length of 0.3 µm, by means of a light pickup which used a semiconductor laser of 680 nm wavelength, using for Z the non-magnetic metals other than Ti shown in Table 18.

TABLE 18

| Z | CNR (dB) | ERASURE FIELD (kA/m) |
|---|---|---|
| Ta | 41.0 | 15 |
| Pt | 43.0 | 16 |
| Au | 43.5 | 15 |
| Cu | 42.5 | 17 |
| Si | 42.0 | 16 |

As Table 18 shows, in each of the cases when Ta, Pt, Au, Cu, and Si were used for Z, CNR was greater than that of a magneto-optical disk not provided wish a reflective layer 10, thus showing the effect of providing the reflective layer 10. On the other hand, with regard to the erasure field, as in the case of including Ti with the Al, it was possible to reduce the erasure field.

The foregoing discussed results obtained by providing a reflective layer in the magneto-optical disk of the seventh embodiment, but it is needless to say that the same results can also be obtained by providing a reflective layer in that of the eighth embodiment.

With regard to (a) thickness of the reproducing layer and isolating layer; (c) Curie temperature of the isolating layer 3'; and (d) compensation temperature of the isolating layer 3', the results obtained in the present ninth embodiment were equivalent to those of the seventh and eighth embodiments above.

TENTH EMBODIMENT

Figure 11:
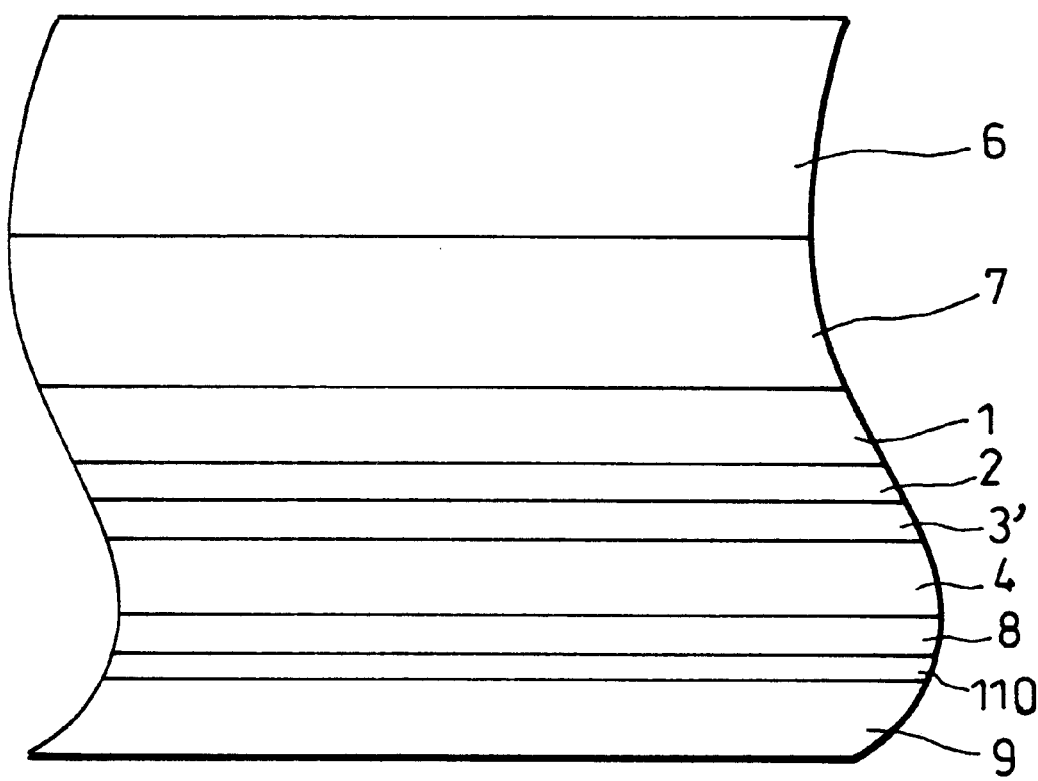
FIG. 11 is a schematic cross-sectional drawing showing the structure of layers in a magneto-optical disk according to the tenth embodiment of the present invention.

The following will explain the tenth embodiment of the present invention with reference to FIG. 11. The present embodiment will explain a case in which the magneto-optical memory medium is embodied as a magneto-optical disk.

As shown in FIG. 11, a magneto-optical disk according to the present tenth embodiment includes a substrate 6, a transparent dielectric layer 7, a reproducing layer 1, a non-magnetic intermediate layer 2, an isolating layer 3', a recording layer 4, a protective layer 8, a heat-dissipating layer 110, and an overcoat layer 9, layered together in that order to make up a disk main body.

A magneto-optical disk according to the present tenth embodiment has a structure in which a heat-dissipating layer 110 is provided between the protective layer 8 and the overcoat layer 9 of the magneto-optical disk according to the seventh embodiment above.

The following will explain (1) the method of formation, and (2) the recording and reproducing characteristics of a concrete example of a magneto-optical disk according to the present tenth embodiment.

(1) Method of Formation

In a magneto-optical disk according to the present tenth embodiment, a heat-dissipating layer 110 made of Al was provided between the protective layer 8 and the overcoat layer 9 of the magneto-optical disk of Concrete Example 2, and the substrate 6, transparent dielectric layer 7, reproducing layer 1, non-magnetic intermediate layer 2, isolating layer 3', recording layer 4, protective layer 8, and overcoat layer 9 were formed as in the seventh embodiment above. The protective layer 8 was provided with a thickness of 5 nm.

After formation of the protective layer 8, the sputtering device was again evacuated to $1 \times 10^{-6}$ Torr, argon was introduced, a voltage was applied to the Al target, and, under a gas pressure of $4 \times 10^{-3}$ Torr, a heat-dissipating layer 10 made of Al, with a thickness of 20 nm, was formed on the protective layer 8.

(2) Recording and Reproducing Characteristics

Measurement of the CNR of a magneto-optical disk according to the present tenth embodiment, by means of a light pickup which used a semiconductor laser of 680 nm wavelength, and a mark length of 0.3 $\mu$m, found a CNR of 42.5 dB, an improvement of 1 dB over Concrete Example 2.

If, as in the present tenth embodiment, a heat-dissipating layer 110 made of highly heat conductive Al is provided, heat spreading out horizontally can be dissipated vertically, i.e., in the direction of the thickness of the heat-dissipating layer 110, thus reducing spreading of the heat in a horizontal (in-plane) direction. Accordingly, the temperature distribution within the light beam spot is steeper, the effect of the isolating layer 3' in masking the reproducing layer 1 from the magnetic field of the recording layer 4 can be enhanced, and reproducing characteristics can be further improved.

The Al used to form the heat-dissipating layer 110 has higher heat conductivity than the rare earth-transition metal alloys used in the reproducing layer 1 and the recording layer 4, and thus is a suitable material for a heat-dissipating layer. In addition, Al is a very inexpensive material.

Instead of Al, a material with a higher heat conductivity than the reproducing layer 1 and the recording layer 4, such as Au, Ag, Cu, SUS, Ta, Cr, etc., may be used for the heat-dissipating layer 110.

Long-term reliability can be improved by using Au, which has good resistance to oxidation, humidity, and pitting.

Long-term reliability can be improved by using Ag, which has good resistance to oxidation, humidity, and pitting.

Long-term reliability can be improved by using Cu, which has good resistance to oxidation, humidity, and pitting.

Again, if one of SUS, Ta, or Cr is used, a magneto-optical disk with even better long-term reliability can be provided, since these materials have even better resistance to oxidation, humidity, and pitting.

The present tenth embodiment used a heat-dissipating layer 110 of 20 nm thickness, but the greater the thickness, the greater the heat-dissipating effect, and long-term reliability is also improved. However, since it also influences the recording sensitivity of the magneto-optical disk, the thickness must be set in accordance with the heat conductivity and specific heat of the material used. A thickness within a range from 5 nm to 200 nm is appropriate, or, more suitably, within a range from 10 nm to 100 nm. If a material with comparatively high heat conductivity and good resistance to corrosion is used, a thin layer 10 nm to 100 nm thick is sufficient, and thus the time required to form the layer can also be reduced.

The foregoing discussed results obtained by providing a heat-dissipating layer in the magneto-optical disk of the seventh embodiment, but it is needless to say that the same results can also be obtained by providing a reflective layer in the magneto-optical disks of the first through sixth, eighth, and ninth embodiments above, or in that of the eleventh through fifteenth embodiments to be discussed below.

With regard to (a) thickness of the reproducing layer and isolating layer; (b) thickness of the non-magnetic intermediate layer 2; (c) Curie temperature of the isolating layer 3'; (d) compensation temperature of the isolating layer 3'; and (e) thickness and material of the reflective layer 10, the results obtained in the present tenth embodiment were equivalent to those of the seventh through ninth embodiments above.

Further, each of the seventh through tenth embodiments above used for the reproducing layer 1 a magnetic layer which had in-plane magnetization at room temperature and perpendicular magnetization at a higher temperature, but any layer may be used which is perpendicularly magnetized at least in the signal reproducing area (the area which is heated to above a predetermined temperature during reproducing).

ELEVENTH EMBODIMENT

Next, the eleventh embodiment of the present invention will be explained in detail with reference to the drawings.

Figure 12:
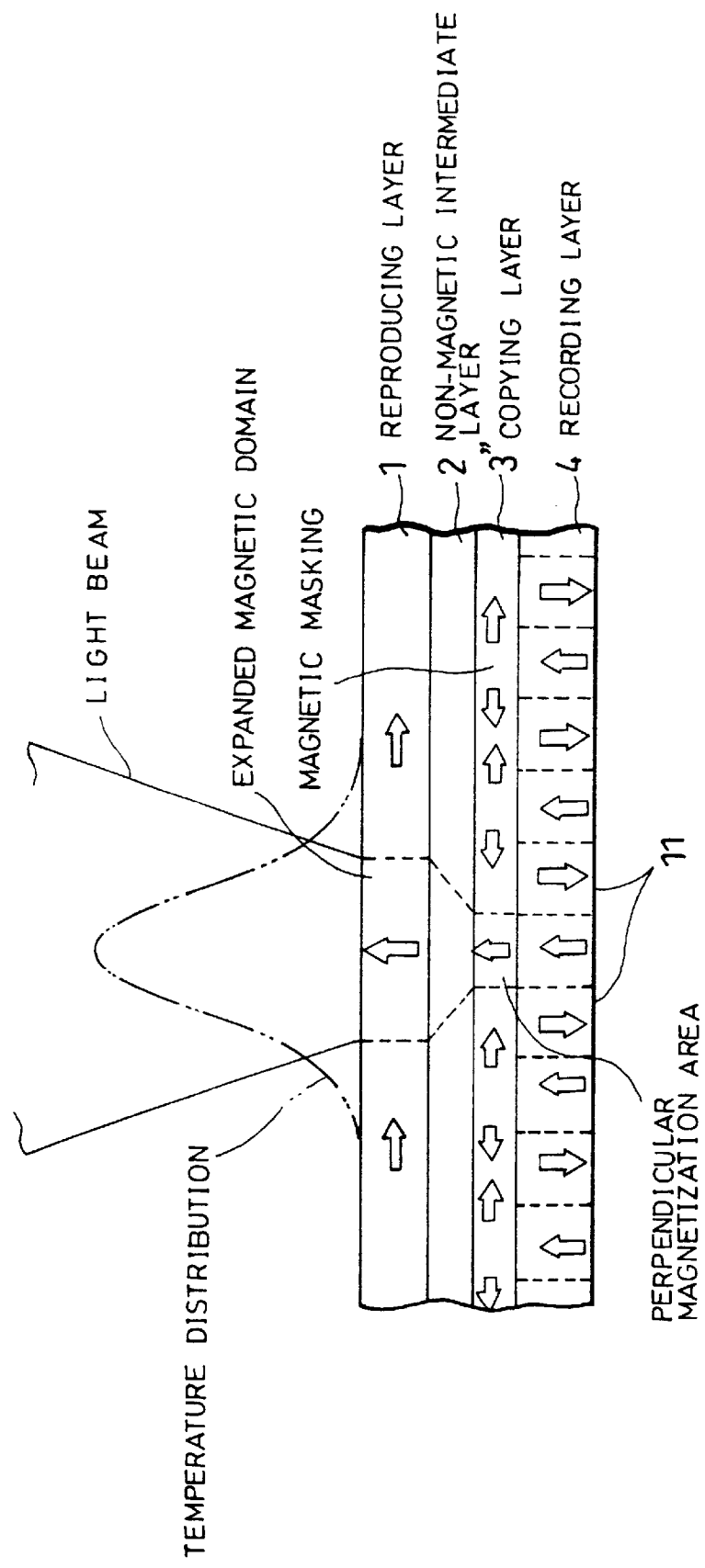
FIG. 12 is a drawing explaining the reproducing principle of magneto-optical disks according to the eleventh through fifteenth embodiments of the present invention.

FIG. 12 shows the principle of magnetic domain expansion reproducing according to the present eleventh embodiment.

In a magneto-optical memory medium according to the present eleventh embodiment, a copying layer 3" (referred to in the claims as the "magnetic masking layer"), which is magnetostatically coupled to the reproducing layer 1, is provided between the reproducing layer 1 and the recording layer 4. The copying layer 3" shows in-plane magnetization at room temperature, and shows perpendicular magnetization above a predetermined temperature. Further, the copying layer 3" masks the magnetization of low-temperature areas 11 of the recording layer 4, which are not heated to above a predetermined temperature (hereinafter referred to as the "critical temperature"). In other words, the copying layer 3" prevents the magnetization of the low-temperature areas 11 of the recording layer 4 from being transmitted to the reproducing layer 3.

By realizing magnetic masking in this way, in the area heated to above the critical temperature, the copying layer 3" shows perpendicular magnetization, masking can be removed, and it becomes possible to reproduce only the information of a desired area of the recording layer 4 with a temperature above the critical temperature.

Accordingly, if the temperature to which the copying layer 3" is heated during reproducing is set such that the copying layer 3" allows the magnetic flux of only one recording bit in the recording layer 4 to leak through, and masks the magnetic flux of the other recording bits, then, even with a small recording bit interval, it is possible to suppress the influence of the surrounding bits (low temperature areas 11), and to copy to the reproducing layer 1 the information of a single recording bit only. Thus good reproducing characteristics can be obtained.

Here, in order to make effective use of magnetostatic coupling between the recording layer 4 and the reproducing layer 1 in the area heated to above the critical temperature, the copying layer 3" must have a Curie temperature higher than the critical temperature. Further, by setting the Curie temperature of the copying layer 3" to a temperature lower than the Curie temperature of the recording layer 4, magnetic influence at the time of recording can be avoided, thus allowing stable recording.

Further, it is preferable if the size of the magnetic domain in the reproducing layer 1 during reproducing by the laser beam (light beam) is large, because the signal quantity is increased, and there is less cause of noise. Again, since the magnetic domain walls of the reproducing layer 1 must move in response to the magnetic field from the recording layer 4, low coercive force is advantageous.

In addition, when reproducing information from the present magneto-optical memory medium, smoother reproducing operations can be obtained by successively forming, reproducing, and erasing the magnetic domains of the reproducing layer 1. For this reason, if the reproducing laser beam emits pulses, it is possible to erase the magnetic domain when the laser is off, and, when the laser emits light, to raise the temperature of the medium, copy the magnetic domain of the recording layer 4 to the reproducing layer 1, and reproduce the signal. Thus the quality of signal reproducing can be increased.

Next, a concrete example according to the present eleventh embodiment will be explained with reference to FIG. 13. The following will explain a case in which the magneto-optical memory medium is embodied as a magneto-optical disk.

Figure 13:
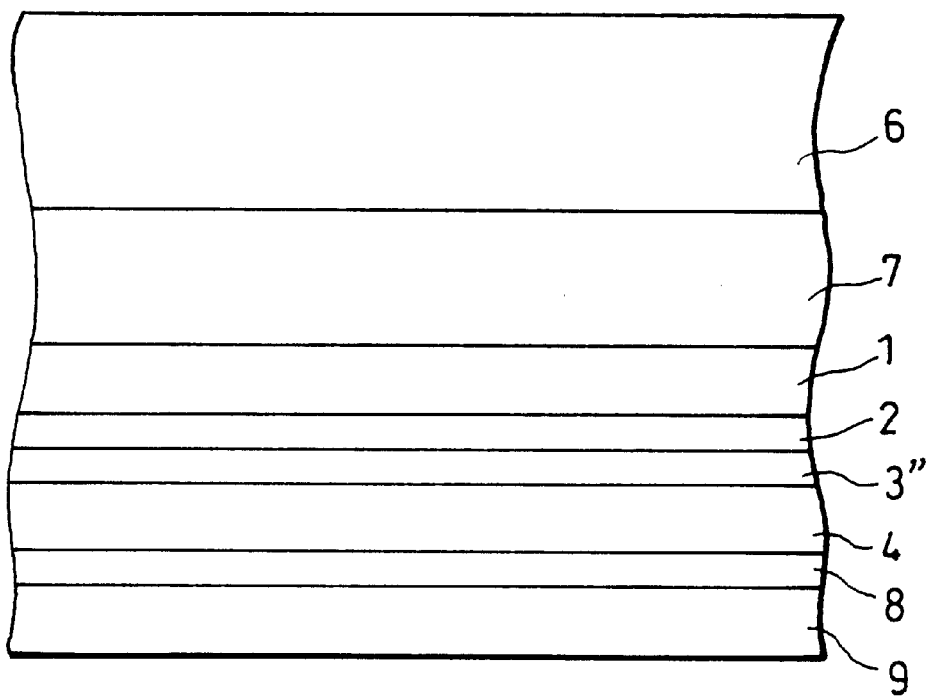
FIG. 13 is a schematic cross-sectional drawing showing the structure of layers in a magneto-optical disk according to the eleventh embodiment of the present invention.

As shown in FIG. 13, a magneto-optical disk according to the present eleventh embodiment includes a substrate 6, a transparent dielectric layer 7, a reproducing layer 1, a non-magnetic intermediate layer 2, a copying layer 3", a recording layer 4, a protective layer 8, and an overcoat layer 9, layered together in that order to make up a disk main body.

In a magneto-optical disk of this type, the recording method used is the Curie temperature recording method. An objective lens is used to focus onto the reproducing layer 1 a light beam 5 emitted by a semiconductor laser, and recording and reproducing are carried out by means of the magneto-optical effect known as polar Kerr effect, which was discussed above.

The substrate 6 is made of a transparent, i.e., light-transmitting, base material such as polycarbonate, and is provided in a disk shape.

The transparent dielectric layer 7 is preferably made of a material with large refractive index, such as AlN, SiN, AlSiN, TiO$_2$, etc. The thickness of the transparent dielectric layer 7 must be set so as to realize a suitable interference effect with respect to the light beam 5, and so as to increase the Kerr revolution angle of the medium. Accordingly, the thickness of the transparent dielectric layer 7 is set to around ($\lambda$/4n), where $\lambda$ is the wavelength of the light beam 5 (reproducing light), and n is the refractive index of the transparent dielectric layer 7. For example, if the wavelength of the laser light is 680 nm, the thickness of the transparent dielectric layer 7 may be set to around 30 nm to 100 nm.

The reproducing layer 1 is a magnetic film made of an alloy of rare earth and transition metals, and its composition is adjusted so that it has the following magnetic characteristics. Namely, it is magnetized in plane at room temperature, but in accompaniment with an increase in temperature, it approaches compensation composition, its total magnetization decreases, the effect of its demagnetizing field weakens, and it shifts to perpendicular magnetization.

The non-magnetic intermediate layer 2 is made of a single layer of a dielectric material such as AlN, SiN, or AlSiN, or of a single layer of a non-magnetic metal such as Al, Ti, or Ta, or of two layers, one of dielectric material and one of non-magnetic metal, and is provided so that the reproducing layer 1 and the recording layer 4 are magnetostatically coupled.

The copying layer 3" is a magnetic film chiefly composed of a rare earth-transition metal alloy, or of rare earth metals, or of transition metals, and has characteristics whereby it shows in-plane magnetization at room temperature, and perpendicular magnetization above a predetermined temperature (the critical temperature). The composition of the copying layer 3" is adjusted so as to satisfy the following conditions discussed above in the explanation of FIG. 12. Namely, at temperatures below the critical temperature, the in-plane magnetization of the copying layer 3" masks the magnetic field produced by the perpendicular magnetization of the recording layer 4, thus preventing leakage of the magnetic field to the reproducing layer 1; but, at temperatures above the critical temperature, because of the perpendicular magnetization of the copying layer 3", it loses its magnetic masking effect, thus making it easier for the magnetic flux produced by the recording layer 4 to pass through to the reproducing layer 1.

The recording layer 4 is a perpendicularly magnetized film made of an alloy of rare earth and transition metals, and its thickness is set within a range from 20 nm to 80 nm.

The protective layer 8 is made of a dielectric material such as AlN, SiN, AlSiN, or SiC, or of an alloy of non-magnetic metals such as Al, Ti, Ta, etc. The protective layer 8 serves to prevent oxidation of the rare earth-transition metal alloys used in the reproducing layer 1, recording layer 4, etc., and its thickness is set to within a range from 5 nm to 60 nm.

The overcoat layer 9 is made of a UV-hardened resin or heat-hardened resin coated onto the remainder of the disk main body by spin coating, and then hardened by applying ultraviolet light or heat.

The following will explain (1) the method of formation, and (2) the recording and reproducing characteristics of a concrete example of a magneto-optical disk with the foregoing structure.

(1) Method of Formation

The following will explain the method of forming a magneto-optical disk with the foregoing structure.

First, a pre-grooved and pre-pitted substrate 6 made of disk-shaped polycarbonate was placed in a substrate holder in a sputtering device supplied with an Al target, two kinds of GdFeCo alloy targets (corresponding to the reproducing layer 1 and the copying layer 3"), and a GdDyFeCo alloy target. After evacuating the interior of the sputtering device to $1\times10^{-6}$ Torr, a mixed gas of argon and nitrogen was introduced, a voltage was supplied to the Al target, and, under a gas pressure of $4\times10^{-3}$ Torr, a transparent dielectric layer 7 made of AlN, with a thickness of 80 nm, was formed on the substrate 6.

Next, after again evacuating the interior of the sputtering device to $1\times10^{-6}$ Torr, argon gas was introduced, a voltage was supplied to one of the GdFeCo alloy targets, and, under a gas pressure of 4×10$^{-3}$ Torr, a reproducing layer 1 made of Gd$_{0.30}$(Fe$_{0.80}$Co$_{0.20}$)$_{0.70}$, with a thickness of 40 nm, was formed on the transparent dielectric layer 7.

The reproducing layer 1 produced had characteristics whereby it was magnetized in-plane at room temperature, and shifted to perpendicular magnetization at 120° C. The reproducing layer 1 had a compensation temperature of 300° C., and a Curie temperature of 320° C.

Next, a mixed gas of argon and nitrogen was introduced, a voltage was applied to the Al target, and, under a gas pressure of 4×10$^{-3}$ Torr, a non-magnetic intermediate layer 2 made of AlN, with a thickness of 20 nm, was formed on the reproducing layer 1.

Next, a voltage was applied to the other GdFeCo target, and, under a gas pressure of 4×10$^{-3}$ Torr, a copying layer 3" made of Gd$_{0.30}$(Fe$_{0.85}$Co$_{0.15}$)$_{0.70}$, with a thickness of 20 nm, was formed on the non-magnetic intermediate layer 2. The copying layer 3" formed had characteristics whereby it was magnetized in plane at room temperature, and shifted to perpendicular magnetization at 120° C., and had a Curie temperature of 250° C.

Next, after again evacuating the interior of the sputtering device to 1×10$^{-6}$ Torr, argon gas was introduced, a voltage was supplied to the GdDyFeCo alloy target, and, under a gas pressure of 4×10$^{-3}$ Torr, a recording layer 4 made of (Gd$_{0.50}$Dy$_{0.50}$)$_{0.23}$(Fe$_{0.80}$Co$_{0.20}$)$_{0.77}$, with a thickness of 40 nm, was formed on the copying layer 3". The recording layer 4 formed had a compensation temperature of 25° C., and a Curie temperature of 275° C.

Next, a mixed gas of argon and nitrogen was introduced, a voltage was applied to the Al target, and, under a gas pressure of 4×10$^{-3}$ Torr, a protective layer 8 made of AlN, with a thickness of 20 nm, was formed on the recording layer 4.

Next, by spin-coating a UV-hardened resin onto the protective layer 8 and projecting ultraviolet light thereon, an overcoat layer 9 was formed.

(2) Recording and Reproducing Characteristics

Figure 14:
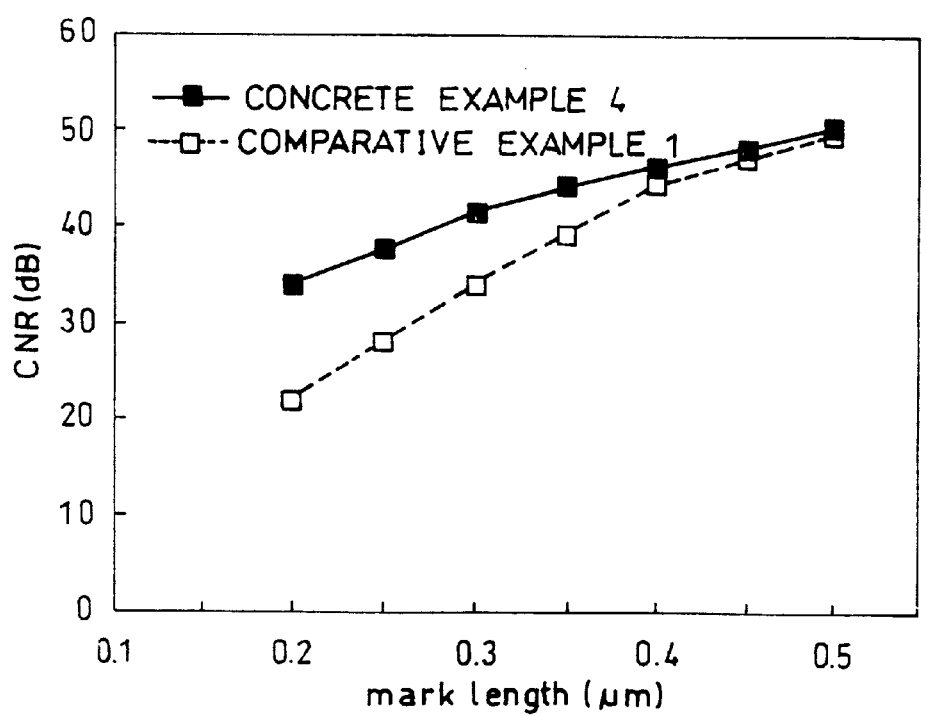
FIG. 14 is a drawing showing recording and reproducing characteristics of a magneto-optical disk according to the eleventh embodiment of the present invention.

FIG. 14 shows the dependence of CNR on mark length in the foregoing magneto-optical disk, measured by means of a light pickup which used a semiconductor laser of 680 nm wavelength. Here, the magneto-optical memory medium according to the present eleventh embodiment is shown as Concrete Example 4.

In addition, for comparative purposes, the dependence of CNR on mark length in a comparative magneto-optical disk not provided with a copying layer 3" is also shown in FIG. 14 as Comparative Example 1. The medium of the magneto-optical disk not provided with a copying layer had the structure of the present eleventh embodiment, but the step for formation of the copying layer 3" was omitted. The dependence of CNR on mark length shown in FIG. 14 is the carrier-to-noise ratio with recording magnetic domains formed with a length corresponding to the mark length and a pitch twice as long as the mark length.

A comparison of the CNR of the two examples at a mark length of 0.3 μm shows that the CNR of Comparative Example 1 was 34.0 dB, and that of Concrete Example 4 was 41.0 dB: an increase of 7.0 dB. This is due to the magnetic masking effect of the copying layer 3" on the recording layer 4, resulting in an improvement in reproducing resolution.

Next, Table 19 shows the results of measurement of the CNR with a mark length of 0.3 μm and various thicknesses of the reproducing layer 1 and the copying layer 3" of Concrete Example 4.

TABLE 19

| REPRODUCING LAYER THICKNESS (nm) | COPYING LAYER THICKNESS (nm) | CNR (dB) |
|---|---|---|
| (COMPARATIVE EXAMPLE 1) | | |
| 40 | 0 | 34.0 |
| 40 | 2 | 35.5 |
| 40 | 5 | 38.5 |
| 40 | 10 | 39.5 |
| (CONCRETE EXAMPLE 4) | | |
| 40 | 20 | 41.0 |
| 40 | 40 | 36.5 |
| 40 | 60 | 34.0 |
| 8 | 20 | 33.0 |
| 10 | 20 | 34.5 |
| 20 | 20 | 36.5 |
| 30 | 20 | 39.0 |
| (CONCRETE EXAMPLE 4) | | |
| 40 | 20 | 41.0 |
| 60 | 20 | 37.0 |
| 80 | 20 | 34.5 |
| 120 | 20 | 33.5 |

In Table 19, the row with a copying layer thickness of 0 nm shows the results for Comparative Example 1, which was not provided with a copying layer 3". Even with a very thin copying layer 3" of 2 nm, strengthening of in-plane magnetization masking resulted in a 1.5 dB increase in CNR. Strengthening of in-plane magnetization masking was realized with copying layers 3" of up to 30 nm thick, but with thicknesses greater than 30 nm, CNR decreased.

This is believed to be due to the fact that the recording layer 4 and the reproducing layer 1 were too far apart, and to the fact that, in-plane magnetic masking being too strong, it was difficult to open a magnetic aperture, and thus a state of completely perpendicular magnetization of the reproducing layer could not be obtained. From Table 19, it can be seen that a CNR greater than that of Comparative Example 1 was obtained with copying layers 3" having thicknesses ranging from 2 nm to 40 nm, more preferably from 5 nm to 38 nm, and even more preferably from 10 nm to 35 nm.

Again, using a reproducing layer 1 of 8 nm thickness reduced the reproducing signal, resulting in a CNR smaller than that of Comparative Example 1. Further, using a reproducing layer 1 of 120 nm thickness increased magnetic domain wall energy produced in the reproducing layer 1, and completely perpendicular magnetization could not be obtained in the area of increased temperature, resulting in a CNR smaller than that of Comparative Example 1. From Table 19, it can be seen that a CNR greater than that of Comparative Example 1 was obtained with reproducing layers 1 having thicknesses ranging from 10 nm to 80 nm.

Next, Table 20 shows the results of measurement of the CNR and the magnetic field required for erasure (erasure field), with a mark length of 0.3μm and various thicknesses of on-magnetic intermediate layers 2 of Concrete Example4.

TABLE 20

| NON-MAGNETIC INTERMEDIATE LAYER THICKNESS (nm) | CNR (dB) | ERASURE FIELD (kA/m) |
|---|---|---|
| 0.5 | 25.0 | 35.5 |
| 1 | 43.5 | 32.4 |
| 4 | 42.0 | 28.8 |
| 10 | 41.0 | 25.4 |

TABLE 20-continued

| NON-MAGNETIC INTERMEDIATE LAYER THICKNESS (nm) | CNR (dB) | ERASURE FIELD (kA/m) |
|---|---|---|
| (CONCRETE EXAMPLE 4) | | |
| 20 | 41.0 | 24.6 |
| 30 | 39.0 | 21.4 |
| 40 | 38.5 | 19.3 |
| 60 | 36.5 | 17.2 |
| 80 | 36.0 | 14.6 |
| 100 | 29.5 | 12.4 |

From Table 20, it can be seen that using a non-magnetic intermediate layer 2 of 0.5 nm thickness resulted in a marked decrease in the CNR. This is believed to be due to the fact that a good state of magnetostatic coupling could not be obtained, because the non-magnetic intermediate layer 2 was too thin. Using a non-magnetic intermediate layer 2 of 1 nm thickness resulted in the maximum CNR value, and it can be seen that further increase of the thickness of the non-magnetic intermediate layer 2 resulted in decrease of magnetostatic coupling force and decrease of CNR. It can be seen that, in order to obtain a CNR higher than that of Comparative Example 1, it is necessary to set the thickness of the non-magnetic intermediate layer 2 within a range from 1 nm to 80 nm.

Further, it can be seen that increasing the thickness of the non-magnetic intermediate layer 2 decreased the magnetostatic coupling of the reproducing layer 1 and the recording layer 2, resulting in a reduction in the erasure field. In order to ensure that the erasure field is within a practical range of 31 kA/m or less, it is preferable to use a non-magnetic intermediate layer 2 not less than 4 nm in thickness.

TWELFTH EMBODIMENT

The present embodiment will explain examples using copying layers 3" differing in composition from that of the concrete examples of the magneto-optical disk discussed in the eleventh embodiment above.

The eleventh embodiment above discussed recording and reproducing characteristics when using a copying layer 3" made of $Gd_{0.30}(Fe_{0.85}Co_{0.15})_{0.70}$ and having a Curie temperature (hereinafter referred to as "$T_{trans}$") of 120° C. However, the present twelfth embodiment will discuss the results of investigation of recording and reproducing characteristics using copying layers 3" of different composition.

Table 21 shows the Curie temperatures $T_{trans}$ of copying layers 3" made of $Gd_x(Fe_{0.85}Co_{0.15})_{1-x}$ of 30 nm thickness, and the results of measurement of CNR, with a mark length of 0.3μm, by means of a light pickup which used a semiconductor laser of 680 nm wavelength, for various values of X (atom ratio).

TABLE 21

| X (ATOM RATIO) | $T_{trans}$ (° C.) | CNR (dB) |
|---|---|---|
| 0.10 | IN-PLANE MAGNETIZATION | 34.0 |
| 0.22 | 80 | 39.0 |
| 0.30 | 120 | 41.5 |
| 0.35 | 150 | 36.0 |
| 0.50 | IN-PLANE MAGNETIZATION | 30.0 |

As Table 21 shows, a CNR greater than that of Comparative Example 1 (34.0 dB), which was not provided with a copying layer 3", was obtained within the range $0.22 \leq X \leq 0.35$. The reproducing layer 1 of the present twelfth embodiment is the same as that of Concrete Example 4, and thus becomes perpendicularly magnetized at 120° C. In other words, it is sufficient if the copying layer 3" is able to enhance in-plane magnetization masking of the reproducing layer 1 at temperatures below 120° C.

However, since the masking effect is weakened if $T_{trans}$ is too low, it is preferable if $X \geq 0.22$. Again, although copying to the reproducing layer 1 is to some extent possible with a high $T_{trans}$, it becomes impossible to sufficiently copy the recorded information to the reproducing layer 1 if $T_{trans}$ is too high. Accordingly, if the copying layer 3" shifts to perpendicular magnetization at a temperature higher than that at which the reproducing layer 1 shifts to perpendicular magnetization, masking is maintained. For this reason, it is preferable if the copying layer 3" has perpendicular magnetization at the reproducing temperature.

Further, in the eleventh and twelfth embodiments, it is sufficient if the $T_{trans}$ of the copying layer 3" satisfies the foregoing conditions, but if the Curie temperature of the copying layer 3" is set to a temperature lower than that of the recording layer 4, magnetic influence at the time of recording can be avoided, thus allowing stable recording.

Further, the eleventh and twelfth embodiments discussed results obtained using copying layers 3" made of GdFeCo, but, as long as the $T_{trans}$ satisfies the foregoing conditions, a copying layer 3" made of GdNdFe, GdNdFeCo, GdTbFe, GdTbFeCo, GdDyFeCo, GdDyFe, GdFe, etc. may also be used.

With regard to the thicknesses of the reproducing layer 1, copying layer 3", and non-magnetic intermediate layer 2, the same results were obtained as in the eleventh embodiment above.

THIRTEENTH EMBODIMENT

The following will explain the thirteenth embodiment of the present invention with reference to FIG. 15. The present embodiment will explain a case in which a magneto-optical disk is used as the magneto-optical memory medium. However, explanation of members equivalent to those of the eleventh and twelfth embodiments will be omitted.

As shown in FIG. 15, a magneto-optical disk according to the present thirteenth embodiment includes a substrate 6, a transparent dielectric layer 7, a reproducing layer 1, a non-magnetic intermediate layer 2, a reflective layer 10, a copying layer 3", a recording layer 4, a protective layer 8, and an overcoat layer 9, layered together in that order to make up a disk main body.

In the eleventh embodiment above, when using copying layers 3" less than 10 nm thick, the light beam 5, passing through the reproducing layer 1 and the non-magnetic intermediate layer 2, was reflected from the recording layer 4, and thus information from the recording layer 4 became mixed with the reproducing signal, resulting in impairment of the masking effect of the in-plane magnetization of the copying layer 3" on the reproducing layer 1.

However, the present thirteenth embodiment provides a reflective layer 10 between the non-magnetic intermediate layer 2 and the copying layer 3" of the magneto-optical disk described in the eleventh embodiment above. By means of this structure, the light beam 5 which has passed through the reproducing layer 1 is reflected by the reflective layer 10, and thus unnecessary information from the recording layer 4 can be prevented from becoming mixed with the reproducing signal.

The following will explain (1) the method of formation, and (2) the recording and reproducing characteristics of a concrete example of a magneto-optical disk according to the present thirteenth embodiment.

(1) Method of Formation

In a magneto-optical disk according to the present thirteenth embodiment, a reflective layer 10 made of Al was provided between the non-magnetic intermediate layer 2 and the copying layer 3" of the eleventh embodiment above, and the substrate 6, transparent dielectric layer 7, reproducing layer 1, non-magnetic intermediate layer 2, copying layer 3", recording layer 4, protective layer 8, and overcoat layer 9 were formed as in Concrete Example 4, except that the reproducing layer 1 was provided with a thickness of 25 nm, and the copying layer 3" with a thickness of 20 nm.

After formation of non-magnetic intermediate layers 2, the sputtering device was again evacuated to $1 \times 10^{-6}$ Torr, argon was introduced, a voltage was applied to the Al target, and, under a gas pressure of $4 \times 10^{-3}$ Torr, reflective layers 10 made of Al, with thicknesses ranging from 2 nm to 80 nm, were formed on the non-magnetic intermediate layers 2.

(2) Recording and Reproducing Characteristics

Table 22 shows the results of measurement of the CNR of magneto-optical disks according to the present thirteenth embodiment with reflective layers 10 of varying thicknesses, by means of a light pickup which used a semiconductor laser of 680 nm wavelength, and a mark length of 0.3 µm.

In Table 22, the row with a reflective layer thickness of 0 nm shows the results for a magneto-optical disk which was not provided with a reflective layer 10. Even with a very thin reflective layer 10 of 2 nm, prevention of reproducing of information from the recording layer 4 was obtained, resulting in a 1.0 dB increase in CNR. As the reflective layer 10 was made thicker, CNR gradually increased, until it reached its maximum value when the reflective layer 10 was 20 nm thick. This was because with thicker reflective layers, the effect of preventing reproducing of information from the recording 4 was more marked. With thicknesses of 30 nm and weakening CNR gradually decreased. This was because of weakening of magnetostatic coupling between the recording layer 4 and the reproducing layer 1 due to increased distance between these two members. From the foregoing, it can be seen that, in order to obtain a CNR greater than that of the magneto-optical disk not provided with a reflective layer 10, it is necessary to set the thickness of the reflective layer 10 within a range from 2 to 50 nm.

TABLE 22

| REFLECTIVE LAYER THICKNESS (nm) | CNR (dB) |
| --- | --- |
| 0 | 38.5 |
| 2 | 39.5 |
| 5 | 40.0 |
| 10 | 41.0 |
| 20 | 42.0 |
| 30 | 41.0 |
| 40 | 38.0 |
| 50 | 34.0 |

FOURTEENTH EMBODIMENT

The thirteenth embodiment above discussed reproducing characteristics when using a reflective layer 10 made of Al. However, in order to improve recording characteristics, the present embodiment will discuss the results obtained using reflective layers made of alloys of Al and metals other than Al. Using reflective layers 10 made of $Al_{1-x}Fe_x$ of 20 nm thickness, Table 23 shows the results of measurement of CNR, with a mark length of 0.3 µm, by means of a light pickup which used a semiconductor laser of 680 nm wavelength, and of measurement of erasure field, for various values of X (atom ratio).

TABLE 23

| X (ATOM RATIO) | CNR (dB) | ERASURE FIELD (kA/m) |
| --- | --- | --- |
| 0.00 | 42.0 | 50 |
| 0.02 | 42.0 | 17 |
| 0.05 | 42.0 | 16 |
| 0.10 | 42.0 | 17 |
| 0.25 | 41.0 | 18 |
| 0.50 | 39.5 | 30 |
| 0.60 | 39.5 | 58 |

As Table 23 shows, CNR gradually decreased as the quantity of Fe included was increased, i.e., as X increased above 0.10. However, in each case CNR was greater than that of a magneto-optical disk not provided with a reflective layer 10, thus showing the effect of providing the reflective layer 10. On the other hand, with regard to the erasure field, a reflective layer 10 made of pure Al required a large erasure field of 50 kA/m, but it was possible to reduce the erasure field by setting X at no less than 0.02, but no more than 0.50.

Next, using reflective layers 10 made of $Al_{1-x}Ni_x$ of 20 nm thickness, Table 24 shows the results of measurement of CNR, with a mark length of 0.3 µm, by means of a light pickup which used a semiconductor laser of 680 nm wavelength, and of measurement of erasure field, for various values of X (atom ratio).

TABLE 24

| X (ATOM RATIO) | CNR (dB) | ERASURE FIELD (kA/m) |
| --- | --- | --- |
| 0.00 | 42.0 | 50 |
| 0.02 | 42.0 | 15 |
| 0.05 | 41.0 | 16 |
| 0.10 | 40.5 | 18 |
| 0.25 | 40.0 | 18 |
| 0.50 | 39.5 | 28 |
| 0.60 | 39.5 | 62 |

As Table 24 shows, as in the case of inclusion of Fe, it was possible to reduce the erasure field by setting X at no less than 0.02, but no more than 0.50.

The erasure field can also be reduced by including with the Al a magnetic metal such as Co, Gd, Tb, Dy, Nd, etc. instead of Fe or Ni.

FIFTEENTH EMBODIMENT

The present embodiment will explain examples using reflective layers 10 made of materials differing from those of the concrete examples of the magneto-optical disks discussed in the thirteenth and fourteenth embodiments above.

The fourteenth embodiment above discussed results obtained with reflective layers 10 which included magnetic metallic elements and Al. The present fifteenth embodiment, however, will discuss improvement of recording characteristics when non-magnetic metallic elements are included with the Al.

Using reflective layers 10 made of $Al_{1-x}Ti_x$ of 20 nm thickness, Table 25 shows the results of measurement of CNR, with a mark length of 0.3 µm, by means of a light pickup which used a semiconductor laser of 680 nm wavelength, and of measurement of erasure field, for various values of X (atom ratio).

As Table 25 shows, there was a slight gradual decrease in CNR as the quantity of Ti included was increased, i.e., as X increased above 0.25. However, in each case CNR was greater than that of a magneto-optical disk not provided with a reflective layer 10, thus showing the effect of providing the reflective layer 10. On the other hand, with regard to the erasure field, reflective layers 10 made of pure Al and pure Ti required large erasure fields of 50 kA/m and 48 kA/m, respectively, but it was possible to reduce the erasure field by setting X at no less than 0.02, but no more than 0.98.

TABLE 25

| X (ATOM RATIO) | CNR (dB) | ERASURE FIELD (kA/m) |
|---|---|---|
| 0.00 | 41.5 | 50 |
| 0.02 | 41.5 | 15 |
| 0.05 | 41.0 | 16 |
| 0.10 | 41.0 | 18 |
| 0.25 | 41.5 | 17 |
| 0.50 | 41.0 | 15 |
| 0.75 | 40.5 | 17 |
| 0.90 | 40.0 | 16 |
| 0.95 | 39.5 | 17 |
| 0.98 | 39.5 | 15 |
| 1.00 | 38.5 | 48 |

Next, Table 26 shows the erasure field reduction effect of including with the Al non-magnetic elements other than Ti. Using reflective layers 10 made of $Al_{0.5}Z_{0.5}$, Table 26 shows the results of measurement of CNR, with a mark length of 0.3 μm, by means of a light pickup which used a semiconductor laser of 680 nm wavelength, using for Z the non-magnetic metals other than Ti shown in Table 26.

TABLE 26

| Z | CNR (dB) | ERASURE FIELD (kA/m) |
|---|---|---|
| Ta | 39.5 | 15 |
| Pt | 41.5 | 16 |
| Au | 41.5 | 15 |
| Cu | 40.5 | 17 |
| Si | 40.5 | 16 |

As Table 26 shows, in each of the cases when Ta, Pt, Au, Cu, and Si were used for Z, CNR was greater than that of a magneto-optical disk not provided with a reflective layer 10, thus showing the effect of providing the reflective layer 10. On the other hand, with regard to the erasure field, as in the case of including Ti with the Al, it was possible to reduce the erasure field.

With regard to the thicknesses of the reproducing layer 1, the copying layer 3", and the non-magnetic intermediate layer 2, the same results were obtained in the thirteenth through fifteenth embodiments as in the eleventh and twelfth embodiments above.

Each of the eleventh through fifteenth embodiments above used for the reproducing layer 1 a magnetic layer which had in-plane magnetization at room temperature and perpendicular magnetization at a higher temperature such as that reached during reproducing, but any layer may be used which is perpendicularly magnetized at least in the signal reproducing area (the area which is heated to above the predetermined temperature (reproducing temperature) during reproducing).

Further, in the eleventh through fifteenth embodiments above, the copying layer 3" is provided adjacent to the recording layer 4, but it may also be magnetostatically coupled with the recording layer 4. By providing a non-magnetic intermediate layer 2 between the copying layer 3" and the recording layer 4, the masking effect can be improved.

SIXTEENTH EMBODIMENT

Figure 17:
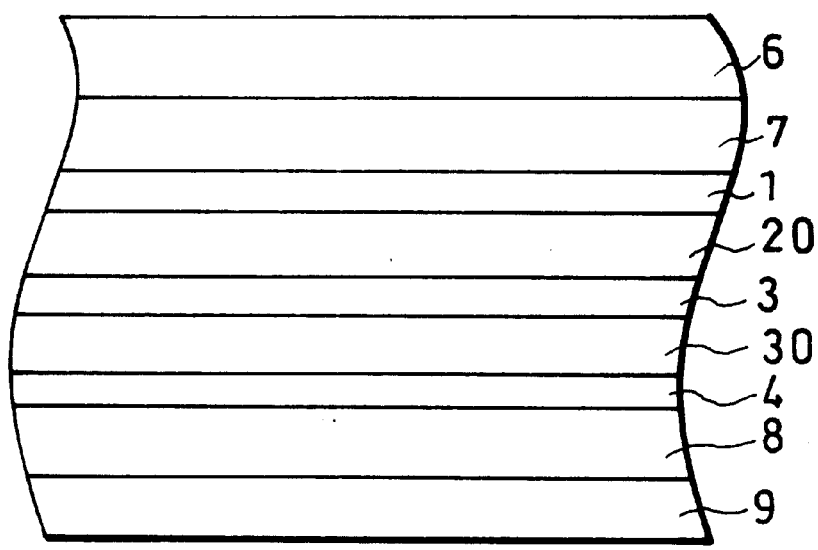
FIG. 17 is a schematic cross-sectional drawing showing the structure of layers in a magneto-optical disk according to the sixteenth embodiment of the present invention.

The following will explain a sixteenth embodiment of the present invention with reference to FIG. 17. The present embodiment will explain a case in which a magneto-optical disk is used as the magneto-optical memory medium.

As shown in FIG. 17, a magneto-optical disk according to the present sixteenth embodiment includes a substrate 6, a transparent dielectric layer 7, a reproducing layer 1, a first non-magnetic intermediate layer 20 (which corresponds to the non-magnetic intermediate layer 2 of foregoing embodiments), an in-plane magnetized layer 3 (magnetic masking layer), a second non-magnetic intermediate layer 30, a recording layer 4, a protective layer 8, and an overcoat layer 9, layered together in that order to make up a disk main body. The basic characteristics of each of the layers other than the second non-magnetic intermediate layer 30 are equivalent to those of the layers discussed in the foregoing embodiments, and thus detailed explanation of these layers will be omitted.

The second non-magnetic intermediate layer 30 is made of a single layer of a dielectric material such as AlN, SiN, AlSiN, or $SiO_2$, or of a single layer of a non-magnetic metal such as Al, Ti, or Ta, or of a combination of two or more layers of dielectric materials and non-magnetic metals. The second non-magnetic intermediate layer 30 is provided so as to block exchange coupling between the in-plane magnetized layer 3 and the recording layer 4, and so that these two members are magnetostatically coupled. The following will explain (1) the method of formation, and (2) the recording and reproducing characteristics of a concrete example of a magneto-optical disk according to the present sixteenth embodiment.

(1) Method of Formation

With regard to the method of formation of the magneto-optical disk according to the present sixteenth embodiment, explanation of steps equivalent to those of the methods of the foregoing embodiments will be omitted, and only steps differing from the foregoing embodiments will be explained below.

The methods of forming the transparent dielectric layer 7, reproducing layer 1, first non-magnetic intermediate layer 20, and in-plane magnetized layer 3 are the same as in the foregoing embodiments. The second non-magnetic intermediate layer 30 is formed as follows.

After formation of the in-plane magnetized layer 3, the sputtering device was again evacuated to $1 \times 10^{-6}$ Torr, a mixed gas of argon and nitrogen was introduced, a voltage was applied to the Al target, and, under a gas pressure of $4 \times 10^{-3}$ Torr, a second non-magnetic intermediate layer 30 made of AlN was formed on the in-plane magnetized layer 3.

Next, after again evacuating the sputtering device to $1 \times 10^{-6}$ Torr, a recording layer 4 and a protective layer of AlN were formed on the second-non magnetic layer 30, in that order, as in the foregoing embodiments. Next, by spin-coating a UV-hardened resin onto the protective layer 8 and projecting ultraviolet light thereon, an overcoat layer 9 was formed.

(2) Recording and Reproducing Characteristics

Table 27 shows the results of measurement of the CNR of magneto-optical disks according to the present sixteenth embodiment with second non-magnetic intermediate layers 30 of varying thicknesses, by means of a light pickup which used a semiconductor laser of 680 nm wavelength, and a mark length of 0.3 μm.

TABLE 27

| REPRODUCING LAYER THICKNESS (nm) | SECOND NON-MAGNETIC INTERMEDIATE LAYER THICKNESS (nm) | CNR (dB) |
|---|---|---|
| 20 | 0 | 41.5 |
| 20 | 2 | 42.0 |
| 20 | 5 | 42.5 |
| 20 | 10 | 42.5 |
| 20 | 30 | 42.5 |
| 20 | 50 | 42.5 |
| 20 | 60 | 41.5 |
| 20 | 80 | 38.5 |
| 20 | 100 | 34.0 |

In Table 27, the row with a second non-magnetic intermediate layer thickness of 0 nm shows the results for Concrete Example 1, which was not provided with a second non-magnetic intermediate layer 30. Provision of a second non-magnetic intermediate layer 30 of no more than 80 nm resulted in high CNR. This will be explained below.

When a second non-magnetic intermediate layer 30 is not provided, the magnetization of the in-plane magnetized layer 3 easily changes to perpendicular magnetization, due to exchange coupling with the recording layer 4. When the temperature rises during reproducing, the magnetization of the in-plane magnetized layer 3 is reduced, and, due to exchange coupling force from the recording layer 4, the in-plane magnetized layer 3 shifts to perpendicular magnetization. For this reason, even in the areas below the predetermined temperature where the in-plane magnetized layer 3 functions as a mask, there are cases when the magnetization of the recording layer 4 leaks through to the reproducing layer 1.

In contrast, when the second non-magnetic intermediate layer 30 is provided, exchange coupling force between the in-plane magnetized layer 3 and the recording layer 4 is blocked by the second non-magnetic intermediate layer 30. Accordingly, even when the temperature rises during reproducing, in areas below the predetermined temperature, the magnetization of the in-plane magnetized layer 3 maintains its in-plane direction. Consequently, in the areas below the predetermined temperature, masking effect is further improve.

However, if the second non-magnetic intermediate layer 30 is too thick, magnetostatic coupling force between the recording layer 4 and the reproducing layer 1 is weakened, and bit information recorded in the recording layer 4 cannot be copied to the reproducing layer 1.

Accordingly, as can be seen from Table 27, it is preferable if the second non-magnetic intermediate layer 30 has a thickness of no less than 2 nm, and no more than 80 nm. Again, as long as it is able to block exchange coupling force between the in-plane magnetized layer 3 and the recording layer 4, the material of the second non-magnetic intermediate layer 30 is not limited to any specific material, but if it is the same material as at least one of the transparent dielectric layer 7 and the first non-magnetic intermediate layer 20 (for example, AlN), the manufacturing process can be simplified.

SEVENTEENTH EMBODIMENT

Figure 18:
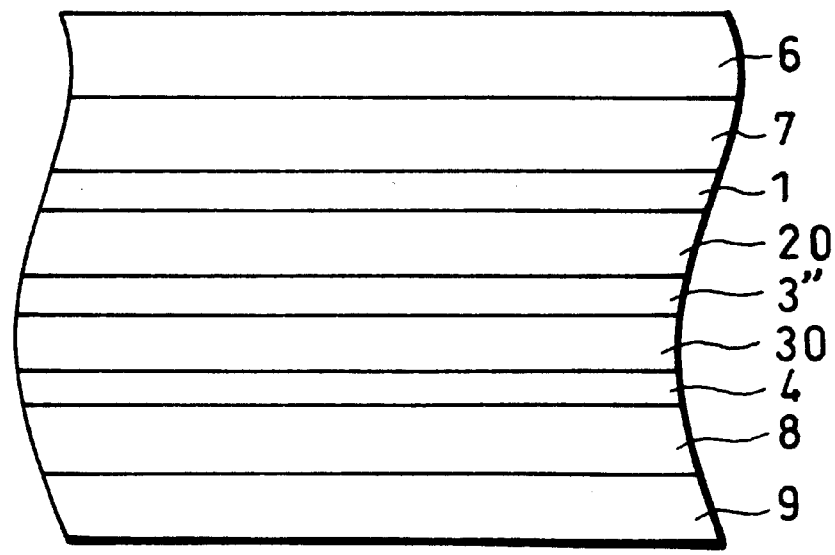
FIG. 18 is a schematic cross-sectional drawing showing the structure of layers in a magneto-optical disk according to the seventeenth embodiment of the present invention.

The following will explain a seventeenth embodiment of the present invention with reference to FIG. 18. The present embodiment will explain a case in which a magneto-optical disk is used as the magneto-optical memory medium.

As shown in FIG. 18, a magneto-optical disk according to the present seventeenth embodiment includes a substrate 6, a transparent dielectric layer 7, a reproducing layer 1, a first non-magnetic intermediate layer 20 (which corresponds to the non-magnetic intermediate layer 2 of foregoing embodiments), a copying layer 3" (magnetic masking layer), a second non-magnetic intermediate layer 30, a recording layer 4, a protective layer 8, and an overcoat layer 9, layered together in that order to make up a disk main body. The basic characteristics of each of the layers other than the second non-magnetic intermediate layer 30 are equivalent to those of the layers discussed in the foregoing embodiments, and thus detailed explanation of these layers will be omitted.

The second non-magnetic intermediate layer 30 is made of a single layer of a dielectric material such as AlN, SiN, AlSiN, or $SiO_2$, or of a single layer of a non-magnetic metal such as Al, Ti, or Ta, or of a combination of two or more layers of dielectric materials and non-magnetic metals. The second non-magnetic intermediate layer 30 is provided so as to block exchange coupling between the copying layer 3" and the recording layer 4, and so that these two members are magnetostatically coupled. The following will explain (1) the method of formation, and (2) the recording and reproducing characteristics of a concrete example of a magneto-optical disk according to the present seventeenth embodiment.

(1) Method of Formation

With regard to the method of formation of tne magneto-optical disk according to the present seventeenth embodiment, explanation of steps equivalent to those of the methods of the foregoing embodiments will be omitted, and only steps differing from foregoing embodiments will be explained below.

The methods of forming the transparent dielectric layer 7, reproducing layer 1, first non-magnetic intermediate layer 20, and copying layer 3" are the same as in the foregoing embodiments. The second non-magnetic intermediate layer 30 is formed as follows.

After formation of the copying layer 3", the sputtering device was again evacuated to $1\times10^{-6}$ Torr, a mixed gas of argon and nitrogen was introduced, a voltage was applied to the Al target, and, under a gas pressure of $4\times10^{-3}$ Torr, a second non-magnetic intermediate layer 30 made of AlN was formed on the copying layer 3".

Next, after again evacuating the sputtering device to $1\times10^{-6}$ Torr, a recording layer 4 and a protective layer of AlN were formed on the second-non magnetic layer 30, in that order, as in the foregoing embodiments. Next, by spin-coating a UV-hardened resin onto the protective layer 8 and projecting ultraviolet light thereon, an overcoat layer 9 was formed.

(2) Recording and Reproducing Characteristics

Table 28 shows the results of measurement of the CNR of magneto-optical disks according to the present seventeenth embodiment with second non-magnetic intermediate layers 30 of varying thicknesses, by means of a light pickup which used a semiconductor laser of 680 nm wavelength, and a mark length of 0.3 $\mu$m.

TABLE 28

| REPRODUCING LAYER THICKNESS (nm) | SECOND NON-MAGNETIC INTERMEDIATE LAYER THICKNESS (nm) | CNR (dB) |
|---|---|---|
| 20 | 0 | 41.0 |
| 20 | 2 | 42.0 |
| 20 | 5 | 42.0 |
| 20 | 10 | 42.5 |

TABLE 28-continued

| REPRODUCING LAYER THICKNESS (nm) | SECOND NON-MAGNETIC INTERMEDIATE LAYER THICKNESS (nm) | CNR (dB) |
|---|---|---|
| 20 | 30 | 42.0 |
| 20 | 50 | 42.0 |
| 20 | 60 | 41.0 |
| 20 | 80 | 37.0 |
| 20 | 100 | 34.0 |

In Table 28, the row with a second non-magnetic intermediate layer thickness of 0 nm shows the results for Concrete Example 4, which was not provided with a second non-magnetic intermediate layer 30. Provision of a second non-magnetic intermediate layer 30 of no more than 80 nm resulted in high CNR. This will be explained below.

When a second non-magnetic intermediate layer 30 is not provided, the magnetization of the copying layer 3" easily changes to perpendicular magnetization, due to exchange coupling with the recording layer 4. When the temperature rises during reproducing, the magnetization of the copying layer 3" is reduced, and, due to exchange coupling force from the recording layer 4, the copying layer 3" shifts to perpendicular magnetization. For this reason, even in the areas below the predetermined temperature where the copying layer 3" functions as a mask, there are cases when the magnetization of the recording layer 4 leaks through to the reproducing layer 1.

In contrast, when the second non-magnetic intermediate layer 30 is provided, exchange coupling force between the copying layer 3" and the recording layer 4 is blocked by the second non-magnetic intermediate layer 30. Accordingly, even when the temperature rises during reproducing, in areas below the predetermined temperature, the magnetization of the copying layer 3" maintains its in-plane direction, and in areas above the predetermined temperature, it shifts to perpendicular magnetization. Consequently, in the areas below the predetermined temperature, masking effect is further improved.

However, if the second non-magnetic interned ate layer 30 is too thick, magnetostatic coupling force between the recording layer 4 and the reproducing layer 1 is weakened, and bit information recorded in the recording layer 4 cannot be copied to the reproducing layer 1.

Accordingly, as can be seen from Table 28, it is preferable if the second non-magnetic intermediate layer 30 has a thickness of no less than 2 nm, and no more than 80 nm. Again, as long as it is able to block exchange coupling force between the copying layer 3" and the recording layer 4, the material of the second non-magnetic intermediate layer 30 is not limited to any specific material, but if it is the same material as at least one of the transparent dielectric layer 7 and the first non-magnetic intermediate layer 20 (for example, AlN), the manufacturing process can be simplified.

In the first through seventeenth embodiments discussed above, a recording assistance layer may be provided between the recording layer 4 and the protective layer 8. For example, a material may be used whereby the recording assistance layer has perpendicular magnetization, has a Curie temperature higher than that of the recording layer 4, and reverses magnetization with a lower magnetic field than the recording layer 4. In this case, during recording, by first reversing the magnetization of the recording assistance layer, thereby reversing that of the recording layer 4 by means of exchange coupling force, recording can be performed with a low magnetic field.

Again, in the first through seventeenth embodiments above, a reproducing layer 1 made of alternating films of Co and Pt may be used. For example, a total of 30 alternating films of Co (0.4 nm thickness) and Pt (0.9 nm thickness) may be layered together (total thickness 19.5 nm; Curie temperature 300° C.). Using this kind of structure of alternating films of Co and Pt can increase the Kerr revolution angle when using a laser of short wavelength, thus further improving reproducing signal quality.

The embodiments and concrete examples of implementation discussed in the foregoing detailed explanations of the present invention serve solely to illustrate the technical details of the present invention, which should not be narrowly interpreted within the limits of such concrete examples, but rather may be applied in many variations without departing from the spirit of the present invention and the scope of the patent claims set forth below.

What is claimed is:

1. A magneto-optical memory medium comprising:

a recording layer having perpendicular magnetization, in which the direction of perpendicular magnetization records information;

a reproducing layer which has perpendicular magnetization at least within a signal reproducing domain; and a magnetic masking layer adapted to allow leakage of magnetic flux from said recording layer at or above a predetermined temperature, thus copying magnetization of said recording layer to said reproducing layer, and adapted to suppress leakage of magnetic flux from said recording layer to said reproducing layer at temperatures below the predetermined temperature;

wherein said magnetic masking layer is provided in a position between said recording layer and said reproducing layer, but in non-abutting relationship with said reproducing layer.

2. The magneto-optical memory medium set forth in claim 1, further comprising:

a non-magnetic layer, provided between said recording layer and said magnetic masking layer.

3. The magneto-optical memory medium set forth in claim 1, wherein:

the predetermined temperature is higher than room temperature, but lower than the vicinity of a reproducing temperature.

4. The magneto-optical memory medium set forth in claim 1, wherein:

the predetermined temperature is in the vicinity of a reproducing temperature.

5. The magneto-optical memory medium set forth in claim 1, wherein:

said reproducing layer has in-plane magnetization at room temperature, and shifts to perpendicular magnetization at a temperature which is higher than room temperature but no higher than the vicinity of a reproducing temperature.

6. The magneto-optical memory medium set forth in claim 1, wherein:

said recording layer and said magnetic masking layer are adjacent to one another.

7. A method of reproducing a magneto-optical memory medium comprising:

providing a recording layer having perpendicular magnetization, in which the direction of perpendicular magnetization records information; a reproducing layer which has perpendicular magnetization at least within a signal reproducing domain; and a magnetic masking layer adapted to allow leakage of magnetic flux from said recording layer at or above a predetermined temperature, thus copying magnetization of said recording layer to said reproducing layer, and adapted to suppress leakage of magnetic flux from said recording layer to said reproducing layer at temperatures below the predetermined temperature; said magnetic masking layer being provided in a position between said recording layer and said reproducing layer, but in non-abutting relationship with said reproducing layer, and;

projecting a light beam onto said magneto-optical memory medium so as to form in said magnetic masking layer a high-temperature domain having a temperature at or above the predetermined temperature and a low-temperature domain having a temperature below the predetermined temperature, and so as to form in said reproducing layer a signal reproducing domain to which magnetization of said recording layer is copied, wherein the high-temperature domain of said magnetic masking layer and the signal reproducing domain of said reproducing layer are formed such that the signal reproducing domain is larger than the high-temperature domain.

8. The method according to claim 7, wherein:
the light beam is projected from the reproducing layer side of said magneto-optical memory medium.
9. The method according to claim 8, wherein:
size of a spot of the light beam on the reproducing layer is set according to size of the signal reproducing domain.
10. The method according to claim 7, wherein:
the high-temperature domain of said magnetic masking layer is set to substantially the same size as a recording domain of said recording layer, where the direction of perpendicular magnetization records information.
11. The method according to claim 7, wherein:
information, which is recorded in the recording layer by the direction of perpendicular magnetization, is reproduced through the signal reproducing domain on which the light beam is projected.
12. The method according to claim 7, wherein:
size of a recording domain of said recording layer, where the direction of perpendicular magnetization records information, is set so as to be smaller than the signal reproducing domain formed by projection of the light beam.

* * * * *